(12) United States Patent
Kapps

(10) Patent No.: US 12,559,192 B2
(45) Date of Patent: Feb. 24, 2026

(54) FRAME FOR MULTI-WHEELED VEHICLE

(71) Applicant: John Campbell Kapps, Rhinelander, WI (US)

(72) Inventor: John Campbell Kapps, Rhinelander, WI (US)

( * ) Notice: Subject to any disclaimer, the term of this patent is extended or adjusted under 35 U.S.C. 154(b) by 648 days.

(21) Appl. No.: 17/981,347

(22) Filed: Nov. 4, 2022

(65) Prior Publication Data

US 2024/0149969 A1     May 9, 2024

(51) Int. Cl.
B62K 19/00     (2006.01)
B62K 5/06     (2006.01)

(52) U.S. Cl.
CPC ............... B62K 19/00 (2013.01); B62K 5/06 (2013.01)

(58) Field of Classification Search
CPC . B62K 19/00; B62K 5/06; B62K 5/05; B62K 5/08
See application file for complete search history.

(56) References Cited

U.S. PATENT DOCUMENTS

| | | | | |
|---|---|---|---|---|
| 4,118,045 A | * | 10/1978 | Kanazawa | ................. B62J 1/02 280/283 |
| 4,296,940 A | | 10/1981 | Herbert | |
| 4,460,192 A | | 7/1984 | Takamiya et al. | |
| 4,650,203 A | * | 3/1987 | Tsutsumikoshi | ... B62D 49/0671 180/311 |
| 4,895,386 A | | 1/1990 | Hellestam et al. | |
| 5,730,670 A | | 3/1998 | Ferrarin | |

| | | | | |
|---|---|---|---|---|
| 10,328,992 B2 | * | 6/2019 | Laxström | ............. B62K 15/008 |
| 2010/0066054 A1 | | 3/2010 | Chen | |
| 2015/0069732 A1 | * | 3/2015 | Godlewski | ............... B62K 5/05 280/267 |
| 2018/0099721 A1 | | 4/2018 | Laxtrom | |
| 2020/0262503 A1 | * | 8/2020 | Garcia-Atance Fatjo | ................... B62K 15/006 |

FOREIGN PATENT DOCUMENTS

| | | | | | |
|---|---|---|---|---|---|
| CN | 106892040 A | * | 6/2017 | ............. | B62K 25/02 |
| CN | 113022768 A | | 6/2021 | | |
| CN | 113071590 A | * | 7/2021 | ............. | B62K 19/20 |
| DE | 10 2013 011 496 A1 | | 1/2015 | | |
| EP | 3945010 A1 | * | 2/2022 | ............... | B62K 5/08 |
| FR | 2759054 A1 | | 8/1998 | | |
| TW | 264802 U | | 12/1995 | | |

OTHER PUBLICATIONS

PCT International Search Report and Written Opinion dtd May 2, 2024 re PCT Appl PCT/US2023/036816.
Taiwan Office Action dtd Mar. 12, 2024 re Appl No. 112211941.
Taiwan Office Action and Search Report with English Translation for corresponding Taiwan Application No. 113117886, issued Feb. 11, 2025, 19 pages.

* cited by examiner

*Primary Examiner* — Drew J Brown
(74) *Attorney, Agent, or Firm* — FOLEY & LARDNER LLP

(57)     ABSTRACT

A multi-wheeled vehicle (e.g., bicycle, tricycle, quadricycle) frame includes a head tube, a seat tube, a top tube, a brace member, and a down tube. The seat tube is disposed away from the head tube. The top tube is coupled to the seat tube and coupled to the head tube. The brace member is coupled to the seat tube and coupled to the head tube. The down tube is coupled to the seat tube and coupled to the head tube.

20 Claims, 16 Drawing Sheets

1405

Coupling a top tube with a seat tube and a head tube

1410

Coupling a down tube with the seat tube and the head tube

1415

Coupling a web tube with the seat tube and the head tube

1400

FRAME FOR MULTI-WHEELED VEHICLE

BACKGROUND

The present invention relates generally to the field of multi-wheeled vehicles, such as bicycles, tricycles, and the like. More specifically, the present invention relates generally to a frame for such vehicles.

SUMMARY OF THE INVENTION

One embodiment of the invention relates to a frame for a multi-wheeled vehicle. The frame includes a head tube, a seat tube, a top tube, a brace member, and a down tube. The seat tube is disposed away from the head tube. The top tube is coupled with the seat tube and coupled with the head tube. The brace member is coupled with the seat tube and coupled with the head tube. The down tube is coupled with the seat tube and coupled with the head tube.

Another embodiment relates to a method for assembling a multi-wheeled vehicle. The method includes coupling a top tube with a seat tube and a head tube. The method includes coupling a down tube with the seat tube and the head tube. The method includes coupling a brace member with the seat tube and the head tube.

Another embodiment relates to a multi-wheeled vehicle. The multi-wheeled vehicle includes a head tube. The multi-wheeled vehicle includes a seat tube disposed away from the head tube. The multi-wheeled vehicle includes a top tube coupled to the seat tube and coupled to the head tube. The multi-wheeled vehicle includes a brace member coupled to the seat tube and coupled to the head tube. The multi-wheeled vehicle includes a down tube coupled to the seat tube and coupled to the head tube. The multi-wheeled vehicle includes a seat stay having a first end and a second end. The first end of the seat stay is coupled to the seat tube at a first location. The multi-wheeled vehicle includes a chain stay having a first end and a second end. The first end of the chain stay is coupled to the seat tube at a second location and the second end of the chain stay is coupled to the second end of the seat stay.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
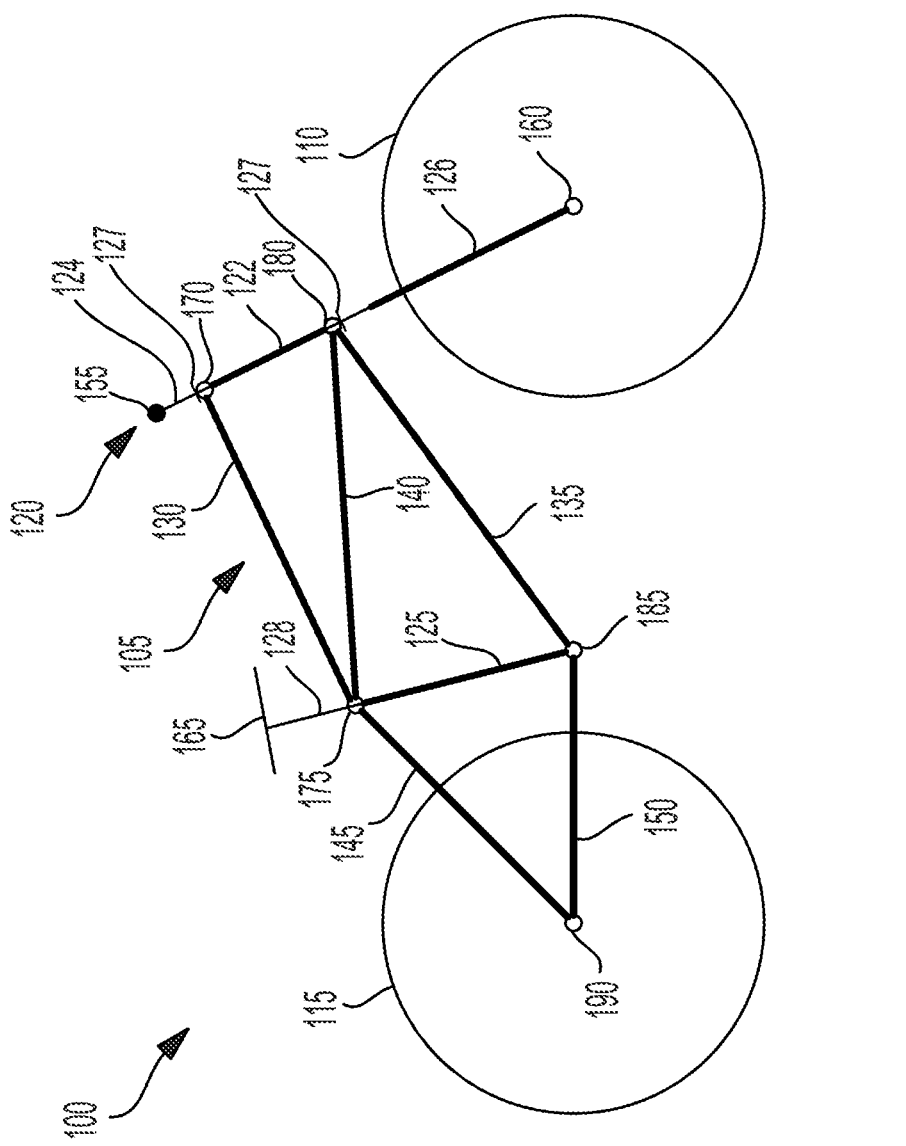
FIG. 1 is a side view of a two-wheeled vehicle or bicycle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a multi-wheeled vehicle frame (e.g., a bicycle frame) can include a plurality of members configured to provide structure to a bicycle. The plurality of members can be arranged in various configurations to couple a front wheel with a rear wheel. The plurality of members can also provide a structure to support a user or rider of the bicycle. A first member of the plurality of members can be a head tube. A second member of the plurality of members can be a steer tube. A first end of the steer tube can couple with a handle of the multi-wheeled vehicle and a second end of the steer tube can couple with the front wheel of the multi-wheeled vehicle via a fork member. A third member of the plurality of members can be a seat tube. A fourth member of the plurality of members can be a seat post. The seat post can provide support for the user of the bicycle. For example, a top of the seat post can couple with a seat for the user.

Some of the plurality of members can extend between the head tube and the seat tube. For example, a fifth member of the plurality of members can be a top tube. The top tube can extend between the head tube and the seat tube. For example, a front end of the top tube can couple with the head tube. The top tube can couple with the head tube at a first head tube work point. A physical connection point between the top tube and the head tube can be at or adjacent to the first head tube work point, as described in more detail herein. A location of a work point may be based on a location of an intersection of a neutral axis (e.g., a central axis of a member with a symmetrical cross-sectional shape) of a first member and a neutral axis of a second member when the frame is assembled (e.g., when the frame is constructed and oriented to be used). For example, the first head tube work point may be located where a neutral axis of a top tube intersects a neutral axis of the head tube when the frame is assembled. The connection point can be located anywhere along the neutral axis of a member between one end of said member and the nearest work point inclusive. For example, the connection point between the top tube and the head tube can be located anywhere along the neutral axis of the top tube between the front end of the top tube and the first head tube work point inclusive. A rear end of the top tube can couple with the seat tube. The top tube can couple with the seat tube at a first seat tube work point. A sixth member of the plurality of members can be a down tube. The down tube can also extend between the head tube and the seat tube. For example, a front end of the down tube can couple with the head tube. The down tube can couple with the head tube at a second head tube work point. The second head tube work point can be closer to the second end of the head tube than the first head tube work point. A rear end of the down tube can couple with the seat tube. The down tube can couple with the seat tube at a second seat tube work point. The second seat tube work point can be further away from the seat than the first seat tube work point. A seventh member of the plurality of members can be a brace member. The brace member can also extend between the head tube and the seat tube. For example, in some embodiments, a front end of the brace member can couple with the head tube at the second head tube work point (e.g., the same work point as the down tube) and a rear end of the brace member can couple with the seat tube at the first seat tube work point (e.g., the same work point as the top tube). In other embodiments, the front end of the brace member can couple with the head tube at the first head tube work point and the rear end of the brace member can couple with the seat member at the second seat tube work point.

The brace member reduces the amount of bending forces applied to the head tube, the seat tube, the top tube, and the down tube, and in conjunction with the orientation of all the members—including but not limited to the seat stay and the chain stay—allowing all the members to instead rely on compressive and/or tensile strength(s) to maintain the structure of the multi-wheeled frame. Therefore, each end of the top tube, the down tube, the brace member, the seat stays, and the chain stays can include a loose pinned connection wherein any member, in the absence of all the other members, could move (e.g., pivot, rotate, etc.) around the transverse axis of either of its connections. Compressive and tensile forces alone can prevent the members from rotating around the hinged connections. Relying on compressive and/or tensile strength(s) alone to maintain the structure of the multi-wheeled frame can allow each connection adjacent to a work point to be a pinned connection (e.g., a hinge), and can minimize the cross-sectional dimensions required for each member. For example, each member can be thinner than a similar member of other multi-wheeled frames that apply bending forces on the members. Furthermore, each hinged connection can be made with a removable pin which can facilitate disassembly of the frame, and thereby transportation of the bicycle.

Figure 2:
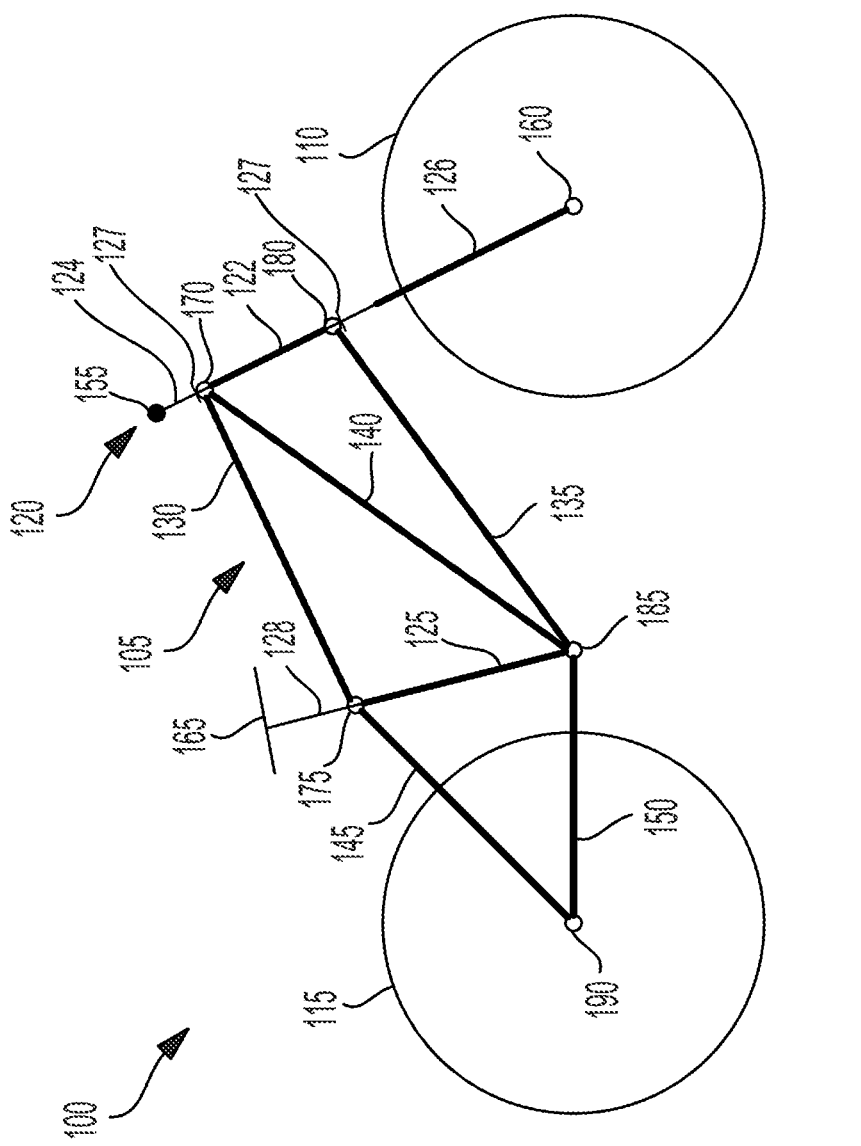
FIG. 2 is a side view of a two-wheeled vehicle or bicycle, according to an exemplary embodiment.

Referring to FIGS. 1 and 2, a side view of an apparatus, shown as bicycle 100, is shown according to an exemplary embodiment. The apparatus may be the bicycle 100 or other vehicles or devices that have a structure and at least two wheels. The bicycle 100 includes at least one frame 105, at least one front wheel 110, and at least one rear wheel 115. The frame 105 provides structure to the bicycle 100 such that structural members of the bicycle 100 remain substantially stationary with respect to each other during use or operation of the bicycle 100. The frame 105 connects at least one front wheel 110 of the bicycle 100 with at least one rear wheel 115 of the bicycle 100. The frame 105 includes a plurality of (structural) members. For example, the frame 105 includes a first member, shown as head tube assembly 120, a second member, shown as seat tube 125, a third member, shown as top tube 130, a fourth member, shown as down tube 135, a fifth member, shown as brace member 140, a sixth member, shown as seat stay 145, and a seventh member, shown as chain stay 150. According to various embodiments, the frame 105 may include any combination of members, including some, all, none, or more than the members described herein. The plurality of members of the frame 105 may be coupled with each other via a plurality of work points. The plurality of members may be oriented in any number of configurations.

The head tube assembly 120 couples a steering mechanism, shown as handle 155, with the front wheel 110 of the bicycle 100. The head tube assembly 120 may be a single member or may comprise of a plurality of members. For example, head tube assembly 120 may include a head tube 122, a steer tube 124 that extends, at least partially, through the head tube 122, and a fork member 126. The head tube assembly 120 may include at least one headset bearing 127. The headset bearing 127 may prevent the steer tube 124 from sliding through the head tube 122. The head tube assembly 120 may include a plurality of headset bearings 127. For example, a first headset bearing may be disposed at a top end of the head tube 122 and a second headset bearing may be disposed at a bottom end of the head tube 122. The steer tube 124 extends between the handle 155 and the fork member 126. The fork member 126 couples with the front wheel 110 via a front wheel work point 160 (e.g., a wheel bearing). The fork member 126 may extend along both sides of the front wheel 110 and couple the head tube assembly 120 with the front wheel work point 160 via both sides of the front wheel 110. The front wheel work point 160 may be a part of a hub of the front wheel 110 or other central structure of the front wheel 110. The front wheel work point 160 may be near or at the center of the front wheel 110.

The seat tube 125 is disposed away from the head tube assembly 120. The seat tube 125 may be a single member. The seat tube 125 may also comprise a plurality of members. The seat tube 125 is configured to receive a seat post 128. The seat post 128 is configured to extend, at least partially, into the seat tube 125. The seat post 128 is coupled with a support device, shown as seat 165. The seat post 128 provides support for a user of the bicycle 100. For example, a top end of the seat post 128 couples with and provides support for the seat 165 such that the user can sit on the seat 165.

The frame 105 includes at least one member that extends between the head tube assembly 120 and the seat tube 125. For example, top tube 130 extends between the head tube assembly 120 and the seat tube 125. The top tube 130 may be a single member. For example, the top tube 130 may be a single pipe extending between the head tube assembly 120 and the seat tube 125. In other embodiments, the top tube 130 may comprise a plurality of members. A front end of the top tube 130 couples with the head tube assembly 120. The top tube 130 couples with the head tube assembly 120 at a first head tube assembly location, shown as first head tube work point 170. The first head tube work point 170 may be closer to the top end of the head tube assembly 120 than the bottom end of the head tube assembly 120. In some embodiments, the first head tube work point 170 is at a top end of the head tube 122.

A rear end of the top tube 130 couples with the seat tube 125. The top tube 130 couples with the seat tube 125 at a first seat tube location, shown as first seat tube work point 175. The first seat tube work point 175 may be closer to the top end of the seat tube 125 than a bottom end of the seat tube 125. The top tube 130 may be pivotally coupled with the head tube assembly 120. The top tube 130 may be pivotally coupled with the seat tube 125. For example, the top tube 130 couples with the head tube assembly 120 such that the top tube 130 can pivot around a transverse axis at or adjacent to the first head tube work point 170. The top tube 130 couples with the seat tube 125 such that the top tube 130 can pivot around a transverse axis at or adjacent to the first seat tube work point 175. The transverse axis of each connection at or adjacent to the first head tube work point 170 and the first seat tube work point 175 is normal (e.g., perpendicular) to a plane of the frame 105. For example, rotation of the top tube 130 around the transverse axis of its connection at or adjacent to either of the first head tube work point 170 or the first seat tube work point 175 is in the plane of the frame 105. The location of the first seat tube work point 175 can remain fixed with respect to the seat tube 125, and therefore each connection at or adjacent to the first seat tube work point 175 can remain stationary with respect to the seat tube 125. For example, as the seat post 128 retracts into the seat tube 125 or extends out of the seat tube 125, the location of the first seat tube work point 175 remains stationary and does not move with the seat post 128. The location of the first head tube work point 170 remains fixed with respect to the head tube assembly 120, and therefore each connection at or adjacent to the first head tube work point 170 can remain stationary with respect to the head tube assembly 120. For example, as the steer tube 124 rotates around its longitudinal axis through the head tube 122, the location of the first head tube work point 170 remains stationary and does not move with the steer tube 124. As such, any connection point at or adjacent to the work points (e.g., 170, 175) also remain stationary.

In some embodiments, another member extends between the head tube assembly 120 and the seat tube 125. For example, the down tube 135 extends between the head tube assembly 120 and the seat tube 125. The down tube 135 may be single member. For example, the down tube 135 may be a single pipe extending between the head tube assembly 120 and the seat tube 125. In other embodiments, the down tube 135 comprises a plurality of members. A front end of the down tube 135 couples with the head tube assembly 120. The down tube 135 couples with the head tube assembly 120 at a second head tube location, shown as second head tube work point 180. The second head tube work point 180 may be closer to the bottom end of the head tube assembly 120 than the top end of the head tube assembly 120. For example, the second head tube work point 180 is disposed a first distance from a top end of the head tube assembly 120 and is disposed a second distance from the bottom end of the head tube assembly 120. The first distance is larger than the second distance. In some embodiments, the second head tube work point 180 is at the bottom end of the head tube 122. The second head tube work point 180 is disposed closer to the bottom end of the head tube assembly 120 than the first head tube work point 170. For example, the first head tube work point 170 is disposed a first distance from the top end of the head tube assembly 120 and the second head tube work point 180 is disposed a second distance from the top end of the head tube assembly 120, wherein the first distance is smaller than the second distance. In some embodiments, the first head tube work point 170 is disposed on an upper head tube and the second head tube work point 180 is disposed on a lower head tube, as described in more detail herein. In some embodiments, both the first and second head tube work points 170, 180 are disposed on the head tube 122.

A rear end of the down tube 135 couples with the seat tube 125. The down tube 135 couples with the seat tube 125 at a second seat tube location, shown as second seat tube work point 185. The second seat tube work point 185 may be positioned at a location where a bottom bracket shell of the bicycle 100 is located. For example, the down tube 135 may couple with the seat tube 125 at the same location as the bottom bracket shell of the bicycle 100. The second seat tube work point 185 may be closer to the bottom end of the seat tube 125 than the first seat tube work point 175. In some embodiments, the second seat tube work point 185 is at the bottom end of the seat tube 125.

The down tube 135 is pivotally coupled with the head tube assembly 120. The down tube 135 is pivotally coupled with the seat tube 125. For example, the down tube 135 couples with the head tube assembly 120 such that the down tube 135 can pivot around a transverse axis of its connection at or adjacent to the second head tube work point 180. The down tube 135 couples with the seat tube 125 such that the down tube 135 can pivot around a transverse axis of its connection at or adjacent to the second seat tube work point 185. The transverse axes of the connections at or adjacent to the second head tube work point 180 and the transverse axes of the connections at or adjacent to the second seat tube work point 185 are normal (e.g., perpendicular) to a plane of the frame 105. For example, rotation of the down tube 135 around either the transverse axis of its connection at or adjacent to the second head tube work point 180 and/or the transverse axis of its connection at or adjacent to the second seat tube work point 185 is in the plane of the frame 105. A location of the second seat tube work point 185 remains fixed with respect to the seat tube 125. A location of the second head tube work point 180 remains fixed with respect to the head tube assembly 120. In some embodiments, the second seat tube work point 185 is disposed at a same location as a bottom bracket shell.

In some embodiments, another member extends between the head tube assembly 120 and the seat tube 125. For example, the brace member 140 extends between the head tube assembly 120 and the seat tube 125. The brace member 140 may be single member. For example, the brace member 140 may be a single pipe extending between the head tube assembly 120 and the seat tube 125. In other embodiments, the brace member 140 comprises a plurality of members. A front end of the brace member 140 couples with the head tube assembly 120. The brace member 140 couples with the head tube assembly 120 at the second head tube work point 180. For example, the brace member 140 couples with the head tube assembly 120 at the same location as the down tube 135. A rear end of the brace member 140 couples with the seat tube 125. The brace member 140 couples with the seat tube 125 at the first seat tube work point 175. For example, the brace member 140 couples with the seat tube 125 at the same location as the top tube 130.

As shown in FIG. 2, among others, the brace member 140 may couple with the head tube assembly 120 and the seat tube 125 at different locations. For example, the brace member 140 couples with the head tube assembly 120 at the first head tube work point 170. The brace member 140 couples with the seat tube 125 at the second seat tube work point 185. In some embodiments, the brace member 140 couples with the head tube assembly 120 at other locations. For example, the brace member 140 couples with the head tube assembly 120 at a third head tube work point. The third head tube work point may be disposed between the first and/or second head tube work points 170, 180. The brace member 140 pivotally couples with the head tube assembly 120. The brace member 140 pivotally couples with the seat tube 125. For example, the brace member 140 couples with the seat tube 125 such that the brace member 140 can pivot around a transverse axis of its connection at or adjacent to the first seat tube work point 175, the second seat tube work point 185, or any other seat tube work point. The brace member 140 couples with the head tube assembly 120 such that the brace member 140 can pivot around a transverse axis of its connection at or adjacent to the first, second, or third head tube work points 170, 180, 505. The transverse axis of each connection at or adjacent to each of the work points 170, 175, 180, 185, 505 may be normal (e.g., perpendicular) to a plane of the frame 105. For example, rotation of the brace member 140 around the transverse axis of either of its connections at or adjacent to any of the work points 170, 175, 180, 185, 505 may be in the plane of the frame 105.

The frame 105 may include the top tube 130, the down tube 135, and the brace member 140 extending between the head tube assembly 120 and the seat tube 125. The frame 105 may also include more or less members extending between the head tube assembly 120 and the seat tube 125.

The frame 105 includes at least one member connecting the seat tube 125 with the rear wheel 115. For example, the frame 105 includes the seat stay 145. The seat stay 145 extends between the seat tube 125 and the rear wheel 115. The seat stay 145 couples with the rear wheel 115 via a rear wheel work point 190. The rear wheel work point 190 may be a part of a hub of the rear wheel 115 or other central structure of the rear wheel 115. The rear wheel work point 190 may be near or at the center of the rear wheel 115. The seat stay 145 couples with the seat tube 125 at the first seat tube work point 175. For example, the seat stay 145 may couple with the seat tube 125 at the same location as the top tube 130 and/or the brace member 140. In some embodiments, the seat stay 145 couples with the seat tube 125 at a different location. The seat stay 145 may be a single member. For example, the seat stay 145 may be a single pipe extending between the seat tube 125 and the rear wheel work point 190. In some embodiments, the seat stay 145 comprises a plurality of members. For example, the seat stay 145 includes a first member extending on a first side of the rear wheel 115 and coupling with a first side of the rear wheel work point 190 and a second member extending on a second side of the rear wheel 115 and coupling with a second side of the rear wheel work point 190. The first and second members of the seat stay 145 may couple with the seat tube 125 at the same location or at different locations. For example, the first and second members of the seat stay 145 may couple with the seat tube 125 at the first seat tube work point 175. The seat stay 145 may include a fork member (e.g., similar to the head tube assembly 120) that extends along both sides of the rear wheel 115.

The seat stay 145 pivotally couples with the seat tube 125. The seat stay 145 pivotally couples with the rear wheel 115. For example, the seat stay 145 couples with the seat tube 125 such that the seat stay 145 can pivot around a transverse axis of its connection at or adjacent to the first seat tube work point 175. The seat stay 145 couples with the rear wheel 115 such that the seat stay 145 can pivot around a transverse axis of its connection at or adjacent to the rear wheel work point 190. The transverse axis of each connection at or adjacent to the first seat tube work point 175 and the transverse axis of each connection at or adjacent to the rear wheel work point 190 is normal (e.g., perpendicular) to a plane of the frame 105. For example, rotation of the seat stay 145 around the transverse axis of its connection at or adjacent to the first seat tube work point 175 or the transverse axis at or adjacent to the rear wheel work point 190 is in the plane of the frame 105.

The frame 105 includes a chain stay 150. The chain stay 150 extends between the seat tube 125 and the rear wheel 115. The chain stay 150 couples with the rear wheel 115 at the rear wheel work point 190. The chain stay 150 couples with the seat tube 125 at the second seat tube work point 185. For example, the chain stay 150 couples with the seat tube 125 at the same location as the down tube 135. In some embodiments, the chain stay 150 couples with the seat tube 125 at a different location. The chain stay 150 pivotally couples with the seat tube 125. The chain stay 150 pivotally couples with the rear wheel 115. For example, the chain stay 150 couples with the seat tube 125 such that the chain stay 150 can pivot around a transverse axis of its connection at or adjacent to the second seat tube work point 185. The chain stay 150 couples with the rear wheel 115 such that the chain stay 150 can pivot around a transverse axis of its connection at or adjacent to the rear wheel work point 190. The transverse axis of each connection at or adjacent to the second seat tube work point 185 and the transverse axis of each connection at or adjacent to the rear wheel work point 190 is normal (e.g., perpendicular) to a plane of the frame 105. For example, rotation of the chain stay 150 around the transverse axis of its connection at or adjacent to the second seat tube work point 185 or the transverse axis of its connection at or adjacent to the rear wheel work point 190 is in the plane of the frame 105.

In some embodiments, all of the work points may pivotally couple the members of the frame 105 to each other. For example, each connection at or adjacent to a work point may be a pivot joint (e.g., a pin joint, knuckle joint, revolute joint, hinge joint, cylindrical joint, ball joint, etc.). The pivot joint may provide relative rotation around a single axis and have one degree of freedom. Other pivot joints may provide additional degrees of freedom. For example, the frame 105 includes a first head tube work point 170, a second head tube work point 180, a first seat tube work point 175, a second seat tube work point 185, a front wheel work point 160, and a rear wheel work point 190. Each of the connections at or adjacent to work points 160, 170, 175, 180, 185, 190 may be a pivot joint that can be a loose connection. For example, the front end of the top tube 130 may have a loose connection with a transverse axis around which the top tube 130 can pivot when not held in place by other members of the frame 105 or by external forces. For example, the top tube 130, when not coupled with the other members, can pivot around the transverse axis of its connection at or adjacent to either the first head tube work point 170 or the first seat tube work point 175. The transverse axis of a connection at or adjacent to a work point can be normal to a plane of the frame 105 such that rotation around said axis is within the plane of the frame 105. A pivot joint may have a pin structure with a removable pin that may extend through an end of a member of the frame 105. The pin can define an axis of rotation around which the member may pivot. Each connection at or adjacent to a work point may be a loose connection. A loose connection, in conjunction with the orientation of all the members of frame 105, can reduce (e.g., minimize to a negligible value) the bending forces resisted by the members. Provided the cross-sectional dimensions of each member are adequate, resisting tensile and compressive forces alone are enough for the members to maintain the structure of the frame 105.

In some embodiments, a subset of the connections at or adjacent to the work points can be loose pivot joints. For example, some of the pivot joints can be loose joints, some can be fixed (i.e. rigid), and some can include a fastener which can be tightened to prevent a member from excessive movement (e.g., vibrating around its neutral axis or moving in a longitudinal or transverse direction) or loosened to allow the connection to become a loose connection. The fastener can also be removable from the connection to facilitate disassembly of the frame 105. The frame 105 can have any combination of loose and tightened connections. In some embodiments, all of the connections are tightened connections. In other embodiments, all of the connections are fixed.

The configuration of all the members of frame 105 allows each member to rely almost entirely on its tensile and/or compressive strength(s) to retain the structure of the frame 105 instead of its bending capacity. The configuration can also reduce the required dimensions of the members to retain the structure of the frame. Any material capable of resisting the loads applied to the multi-wheeled frame 105 can be used. For example, the members can be steel pipes. Steel members can, for example, range in diameter from 0.25 inches to 1 inch and in wall thickness from 0.028 inches to 0.058 inches. The members can also be, for example, aluminum pipes. Aluminum members can, for example, range in diameter from 0.25 inches to 1.5 inches and in wall thickness from 0.062 inches to 0.094 inches. For example, a steel member can be a pipe with a diameter of 0.5 inches and a wall thickness of 0.028 inches, and an aluminum member can be a pipe with a 0.625 inches diameter and a wall thickness of 0.062 inches. Moreover, the frame 105 does not require other structural features that add unnecessary weight to a bicycle (e.g., welded joints; members with large cross-sectional areas).

Figure 3:
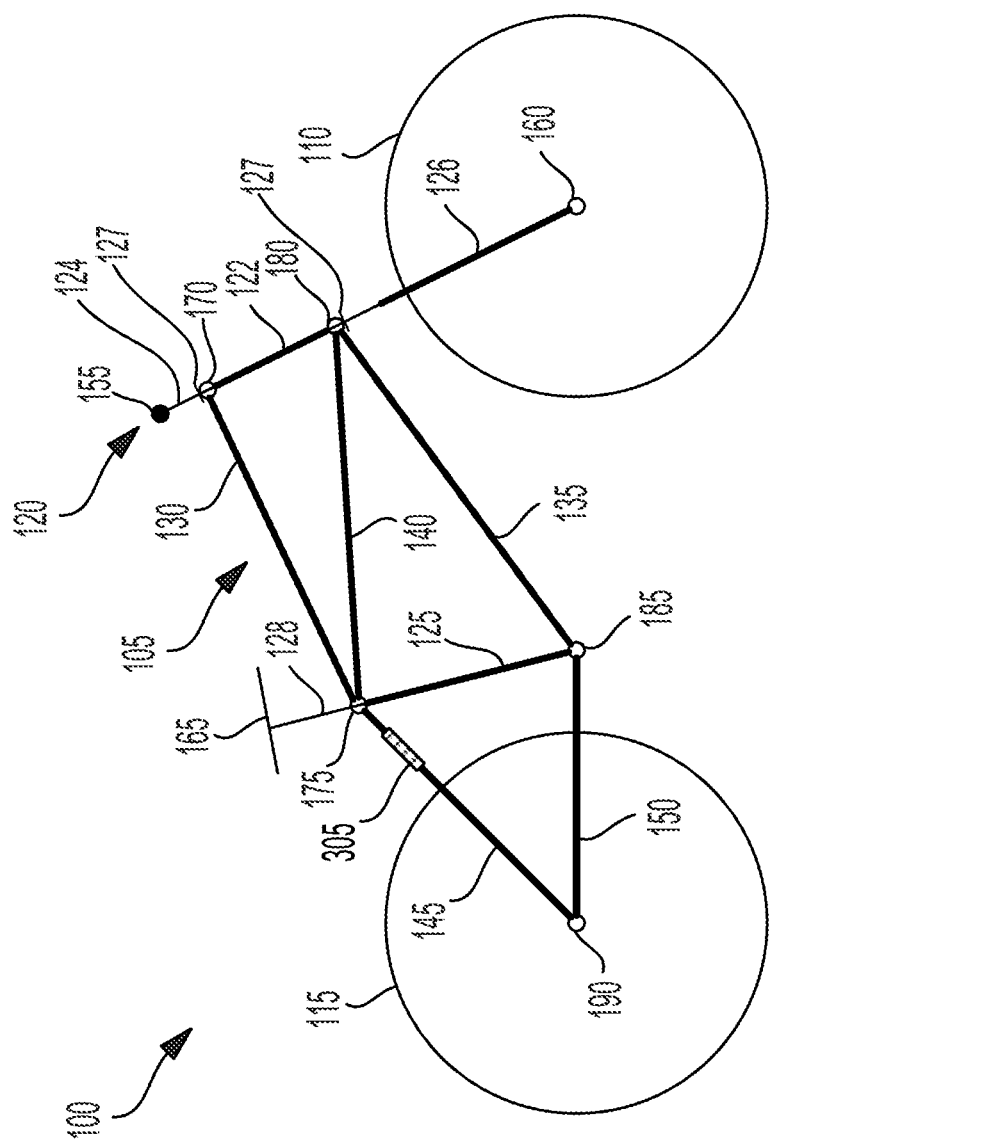
FIG. 3 is a side view of a two-wheeled vehicle or bicycle, according to an exemplary embodiment.
Figure 4:
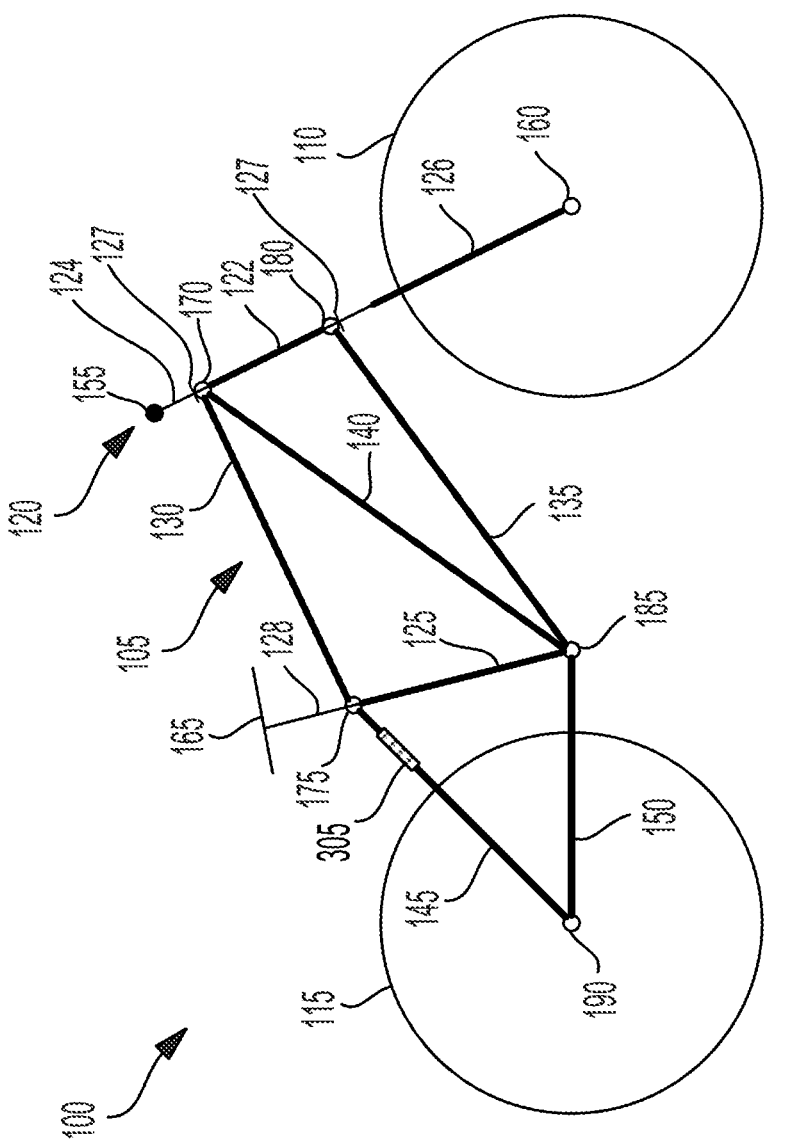
FIG. 4 is a side view of a two-wheeled vehicle or bicycle, according to an exemplary embodiment.

Referring now to FIGS. 3 and 4, a side view of bicycle 100 is shown, according to exemplary embodiments. Bicycle 100 includes at least one rear suspension mechanism, shown as rear shock absorber 305. The rear suspension mechanism may be any type of suspension system, including but not limited to a shock absorber, a linkage, and a spring. A frame 105 with any of the member configurations disclosed herein may include a rear shock absorber 305. The rear shock absorber 305 may be disposed on any member of the frame 105 disposed in the rear portion of the bicycle 100 (e.g., behind the seat tube 125). For example, the seat stay 145 includes a rear shock absorber 305. The rear shock absorber 305 may be disposed at any position along the seat stay 145. For example, the rear shock absorber 305 is disposed proximate (e.g., within ten inches) to the first seat tube work point 175. For example, the rear shock absorber 305 can be within six inches of the first seat tube work point 175. In some embodiments, the rear shock absorber 305 is centered on the seat stay 145 or closer to the rear wheel work point 190.

In some embodiments, the frame 105 includes a plurality of seat stays 145. Each of the plurality of seat stays 145 may have a rear shock absorber 305.

Figure 5:
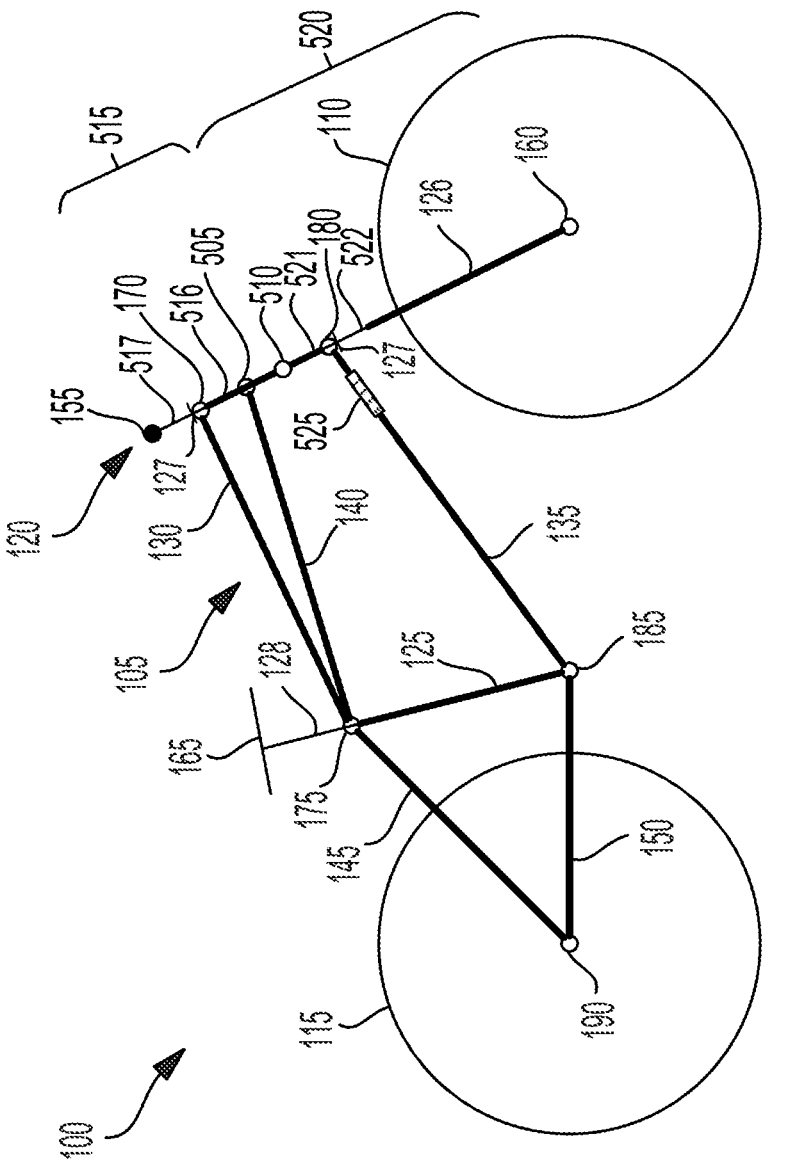
FIG. 5 is a side view of a two-wheeled vehicle or bicycle, according to an exemplary embodiment.
Figure 6:
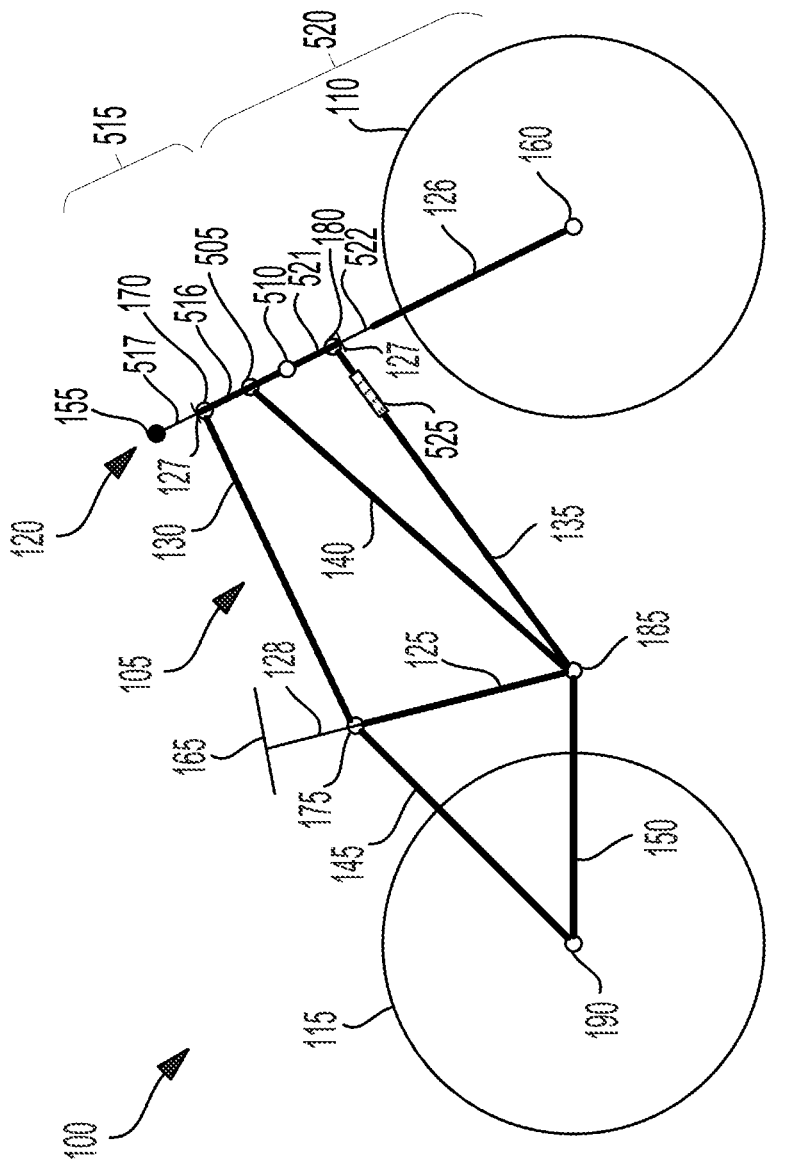
FIG. 6 is a side view of a two-wheeled vehicle or bicycle, according to an exemplary embodiment.

Referring now to FIGS. 5 and 6, a side view of bicycle 100 is shown, according to exemplary embodiments. The frame 105 of the bicycle 100 can have various orientations of the brace member 140. For example, the brace member 140 extends between the head tube assembly 120 and the seat tube 125. A rear end of the brace member 140 couples with at least one of the first seat tube work point 175 or the second seat tube work point 185. In some embodiments, the front end of the brace member 140 couples with the head tube assembly 120 at a third head tube work point 505. The third head tube work point 505 may be disposed between the first and second head tube work points 170, 180. The third head tube work point 505 may be disposed closer to one of the first or second head tube work points 170, 180 or disposed between the first and second head tube work points 170, 180.

In some embodiments, the head tube assembly 120 includes a joint 510. The joint 510 may include a head tube joint and a steer tube joint. The head tube joint and the steer tube joint may be any kind of joint. For example, the head tube joint may be a hinge, and the steer tube joint may be a universal joint or a spherical gear. The combination of the head tube joint and the steer tube joint at joint 510 may facilitate the function of the steer tube 124. For example, the steer tube joint may allow the steer tube 124 to pivot around an axis of the steer tube joint while the head tube joint prevents the steer tube 124 from pivoting around the steer tube joint outside the plane of the bicycle frame 105. A boot on the head tube joint can protect the steer tube joint from external elements.

The joint 510 defines a first portion and a second portion of the head tube assembly 120. The first portion is shown as upper portion 515 and the second portion is shown as lower portion 520. The upper portion 515 includes an upper head tube 516 and an upper steer tube 517. The upper steer tube 517 extends from the handle 155, through the upper head tube 516 to the steer tube joint of the joint 510. The lower portion 520 includes a lower head tube 521 and a lower steer tube 522. The lower steer tube 522 extends from the steer tube joint of the joint 510 through the lower head tube 521 to the fork member 126. The joint 510 comprising both the head tube joint and the steer tube joint facilitates movement between the upper portion 515 and the lower portion 520. For example, the combination of the head tube joint and the steer tube joint allows the upper portion 515 to move relative to the lower portion 520. For example, the upper portion 515 may remain stationary while the lower portion 520 pivots around joint 510 within the plane of the frame 105. In some embodiments, at least one of the first and third head tube work points 170, 505 is disposed on the upper portion 515 and the second head tube work point 180 is disposed on the lower portion 520. The members 130, 135, and 140 may be oriented such that work points 170 and 505 are disposed on the upper portion 515 and work point 180 is disposed on the lower portion 520. The upper portion 515 may be longer than the lower portion 520.

Bicycle 100 may include at least one front suspension mechanism, shown as front extension spring 525. The front suspension mechanism may be any type of suspension system, including but not limited to an extension spring, a shock absorber, a linkage, etc. A frame 105 with any of the member configurations which include a head tube joint and a steer tube joint may also include a front extension spring 525. The front extension spring 525 may be disposed on any member of the frame 105 disposed in the front portion of the bicycle 100 (e.g., in front of the seat tube 125). For example, the front extension spring 525 is disposed on the down tube 135. The front extension spring 525 may be disposed at any position along the down tube 135. For example, the front extension spring 525 is disposed proximate to the front end of the down tube 135. For example, the front extension spring 525 may be within six inches of the front end of the down tube 135. In some embodiments, the front extension spring 525 is centered on the down tube 135 or closer to the rear end of the down tube 135. The front extension spring 525 may be the same as or different than the rear shock absorber 305. Bicycle 100 may include the front extension spring 525 whether the frame 105 has or does not have a joint 510 disposed along the head tube assembly 120.

Figure 7:
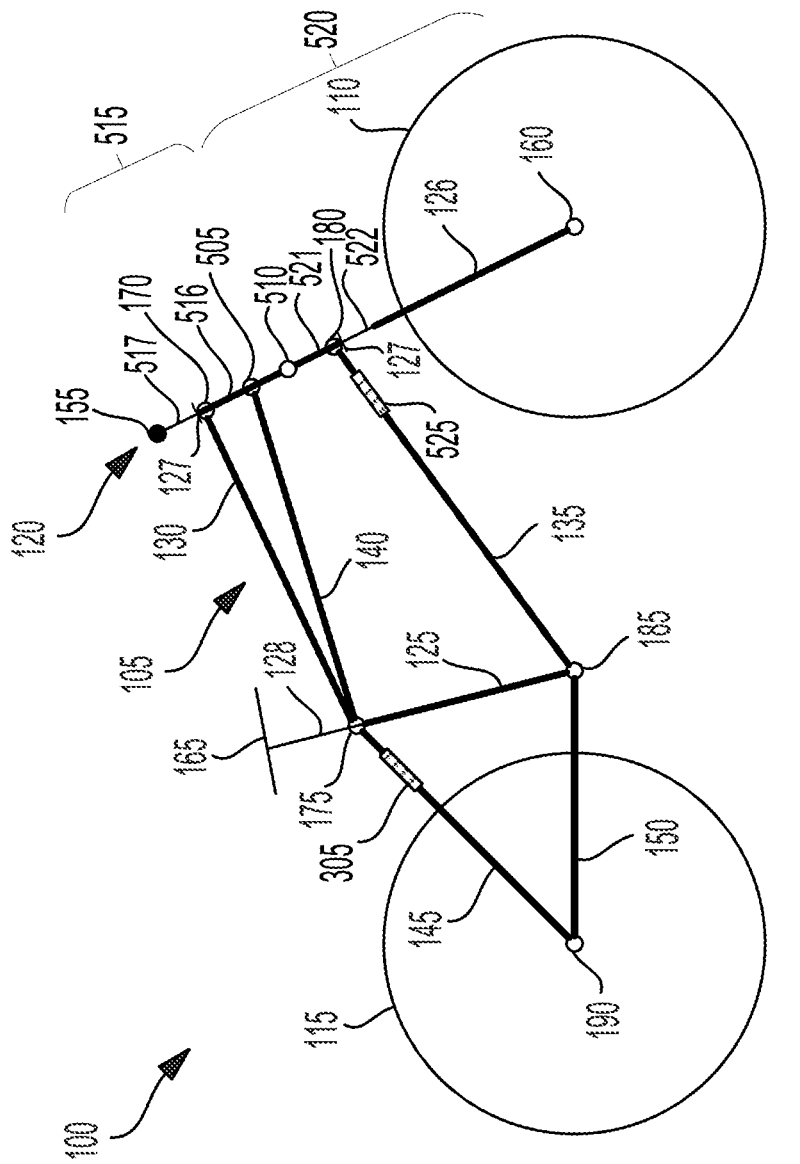
FIG. 7 is a side view of a two-wheeled vehicle or bicycle, according to an exemplary embodiment.
Figure 8:
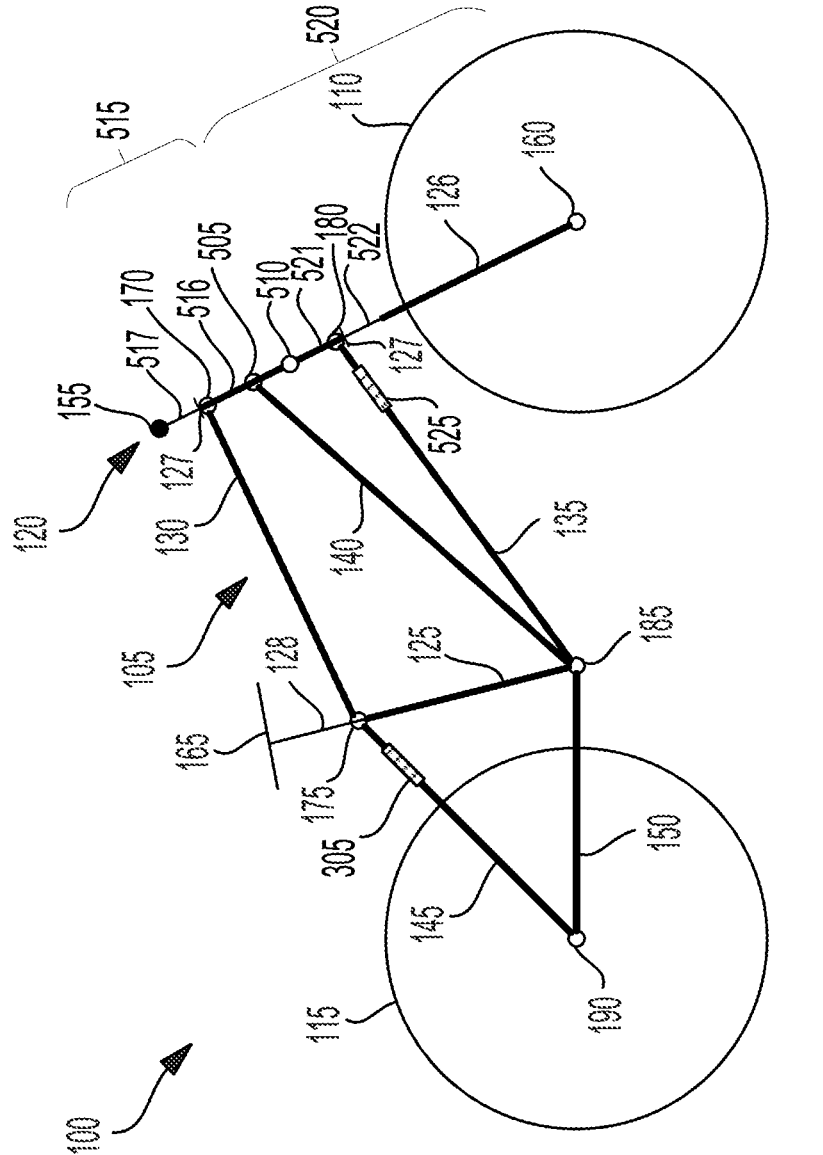
FIG. 8 is a side view of a two-wheeled vehicle or bicycle, according to an exemplary embodiment.

Referring now to FIGS. 7 and 8, a side view of bicycle 100 is shown, according to exemplary embodiments. Bicycle 100 includes a plurality of suspension mechanisms. For example, Bicycle 100 includes a first suspension mechanism, shown as rear shock absorber 305, and a second suspension mechanism, shown as front extension spring 525. The rear shock absorber 305 is disposed on the seat stay 145. In some embodiments, the rear shock absorber 305 is disposed closer to a front end of the seat stay 145 than the rear end of the seat stay 145. The down tube 135 includes a front extension spring 525. In some embodiments, the front extension spring 525 can be disposed closer to a front end of the down tube 135 than a rear end of the down tube 135. For example, the front extension spring 525 is disposed proximate to the second head tube work point 180. For example, the front extension spring 525 may be within six inches of the second head tube work point 180.

Figure 9A:
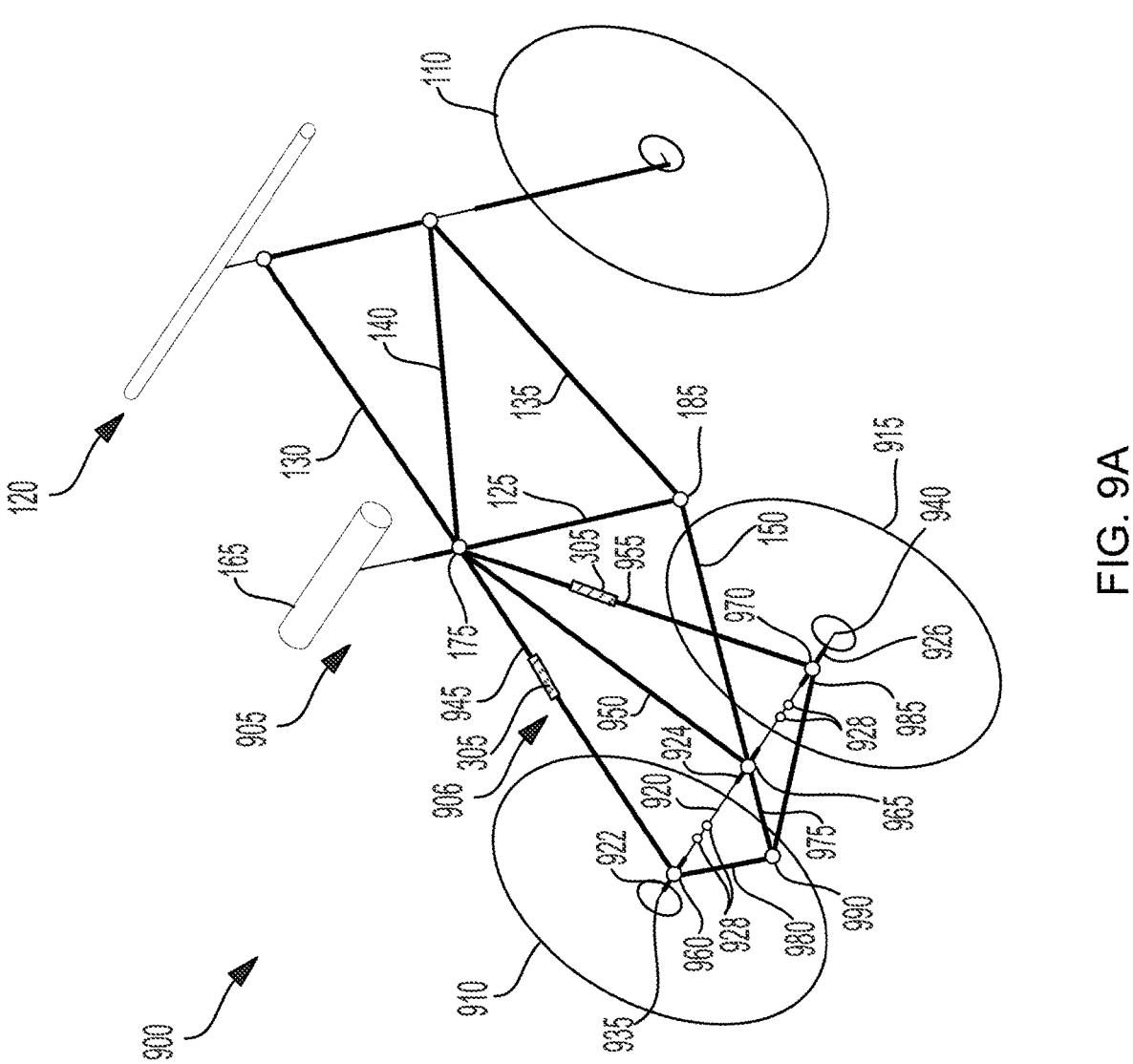
FIG. 9A is a perspective view of a three-wheeled vehicle or delta tricycle, according to an exemplary embodiment.

Referring now to FIG. 9A, an isometric view of a three-wheeled vehicle (shown as delta tricycle 900) is shown, according to an exemplary embodiment. The delta tricycle 900 includes a frame 905. Frame 905 may be similar to frame 105. For example, frame 905 includes a head tube assembly 120, a seat tube 125, a top tube 130, a down tube 135, and a brace member 140. The delta tricycle 900 includes a rear assembly 906. The rear assembly 906 can include the additional members described herein that are disposed, at least partially, behind the seat tube 125 of the delta tricycle 900. The delta tricycle 900 includes the front wheel 110, a first rear wheel, shown as left rear wheel 910, and a second rear wheel, shown as right rear wheel 915. The delta tricycle 900 includes a rear assembly 906. The rear assembly 906 can include additional members of the frame 905 as described herein that are disposed, at least partially, behind the seat tube 125 of the delta tricycle 900. The rear assembly 906 can include the members of the frame 905 that accommodate and control the two rear wheels 910, 915.

The left rear wheel 910 has an axis, shown as left rear wheel axis 935, and the right rear wheel 915 has an axis, shown as right rear wheel axis 940. The left rear wheel 910 is coupled to the frame 905 via the left rear wheel axis 935 and the right rear wheel 915 is coupled to the frame 905 via the right rear wheel axis 940. For example, the delta tricycle 900 may also include a rear axle 920. The rear axle 920 can extend between the left rear wheel axis 935 and the right rear wheel axis 940. The left rear wheel 910 and the right rear wheel 915 can couple to the frame 905 via the rear axle 920. For example, the left rear wheel 910 can couple to the frame 905 via a first end of the rear axle 920 and the right rear wheel 915 can couple to the frame 905 via a second end of the rear axle 920. The rear axle 920 can extend between the left rear wheel 910 and the right rear wheel 915 through a plurality of rear axle tubes. For example, the frame 905 can include a first rear axle tube, shown as left rear axle tube 922, a second rear axle tube, shown as middle rear axle tube 924, and a third rear axle tube, shown as right rear axle tube 926. The left rear axle tube 922 may include or define a first rear axle work point 960. The middle rear axle tube 924 may include or define a second rear axle work point 965. The right rear axle tube 926 may include or define a third rear axle work point 970. The rear axle 920 can extend through the left rear axle tube 922, the middle rear axle tube 924, and the right rear axle tube 926. In some embodiments, the frame 905 may include only a left rear axle tube 922 and a right rear axle tube 926. For example, the left rear axle tube 922 may extend between the second rear axle work point 965 and the first rear axle work point 960 (and may extend beyond the first rear axle work point 960). The right rear axle tube 926 may extend between the second rear axle work point 965 and the third rear axle work point 970 (and may extend beyond the third rear axle work point 970). As such, the left rear axle tube 922 may couple with the right rear axle tube 926 at the second rear axle work point 965.

The frame 905 also includes a first leg tube, shown as left leg tube 945, a seat stay, shown as seat stay 950, and a second leg tube, shown as right leg tube 955. A first end of the left leg tube 945 can be coupled to or integral with the left rear axle tube 922 at the first rear axle work point 960. The first rear axle work point 960 can be disposed proximate to a first end of the rear axle 920. A first end of the seat stay 950 can be coupled to or integral with the middle rear axle tube 924 at the second rear axle work point 965. The second rear axle work point 965 can be disposed proximate to a center of the rear axle 920. A first end of the right leg tube 955 can be coupled to or integral with the right rear axle tube 926 at a third rear axle work point 970. The third rear axle work point 970 can be disposed proximate to a second end of the rear axle 920. A second end of the seat stay 950 and a second end of each leg tube 945, 955 can be coupled to or integral with the seat tube 125. For example, the second end of the seat stay 950 and the second end of each leg tube 945, 955 may be coupled to the seat tube 125 via the first seat tube work point 175. The frame 905 further comprises a chain stay 150 that extends between the seat tube 125 and the rear axle. The chain stay 150 can extend between the second seat tube work point 185 and the second rear axle work point 965.

The frame 905 can further include a tail tube 975. The tail tube 975 is coupled to or integral with one of the left rear axle tube 922 (e.g., when rear gears are on the right side of the frame 905), the middle rear axle tube 924, or the right rear axle tube 926 (e.g., when rear gears are on the left side of the frame 905). For example, the tail tube 975 can couple to one of the left rear axle tube 922, the middle rear axle tube 924, or the right rear axle tube 926 via the second rear axle work point 965. The tail tube 975 can extend from one of the left rear axle tube 922, the middle rear axle tube 924, or the right rear axle tube 926 in a rearward direction (e.g., away from a front of the delta tricycle 900). The tail tube 975 can extend parallel to the chain stay 150. The frame 905 can further include a first tail tube brace, shown as left tail tube brace 980, and a second tail tube brace, shown as right tail tube brace 985. A first end of the left tail tube brace 980 can couple to or be integral with the left rear axle tube 922. For example, the first end of the left tail tube brace 980 can couple to the left rear axle tube 922 via the first rear axle work point 960. A first end of the right tail tube brace 985 can couple to or be integral with the right rear axle tube 926. For example, the first end of the right tail tube brace 985 can couple to the right rear axle tube 926 via the third rear axle work point 970. A second end of the left tail tube brace 980 can couple to or be integral with a second end of the right tail tube brace 985 at a tail work point 990. The tail tube 975 can couple to or be integral with the second end of each tail tube braces 980, 985. For example the tail tube 975 can couple to the tail tube braces 980, 985 via the tail work point 990.

The frame 905 of delta tricycle 900 can incorporate any frame configuration disclosed herein. For example, frame 905 can include any number of suspension mechanisms (e.g., rear shock absorber 305, extension spring 525) and may include the brace member 140 disposed at any of the various orientations. The frame 905 may include a first rear shock absorber 305 disposed on the left leg tube 945, a second rear shock absorber 305 disposed on the seat stay 950, and a third rear shock absorber 305 disposed on the right leg tube 955. In some embodiments, only the left leg tube 945 and the right leg tube 955 may have a rear shock absorber 305. Frame 905 may also include a front extension spring 525 disposed on the down tube 135.

The frame 905 may include one or more joints 928. The joint 928 may be similar to the joint 510. The joint 928 may be a constant velocity joint. The frame 905 may include a first and second joint 928 disposed on the rear axle 920 between the first rear axle work point 960 and the second rear axle work point 965 and a third and fourth joint 928 disposed on the rear axle 920 between the second rear axle work point 965 and the third rear axle work point 970. The joints 928 may keep each rear wheel 910, 915 in a substantially vertical position.

A rear end of the brace member 140 may be coupled to the seat tube 125 via the first seat tube work point 175 and a front end of the brace member 140 may be coupled to one of the second or third head tube work points 180, 505. In some embodiments, the rear end of the brace member 140 may be coupled to the seat tube 125 via the second seat tube work point 185 and the front end of the brace member 140 may be coupled to the first head tube work point 170. Some or all of the connections between members of the frame 905 can include loose connections, as described herein.

Figure 9B:
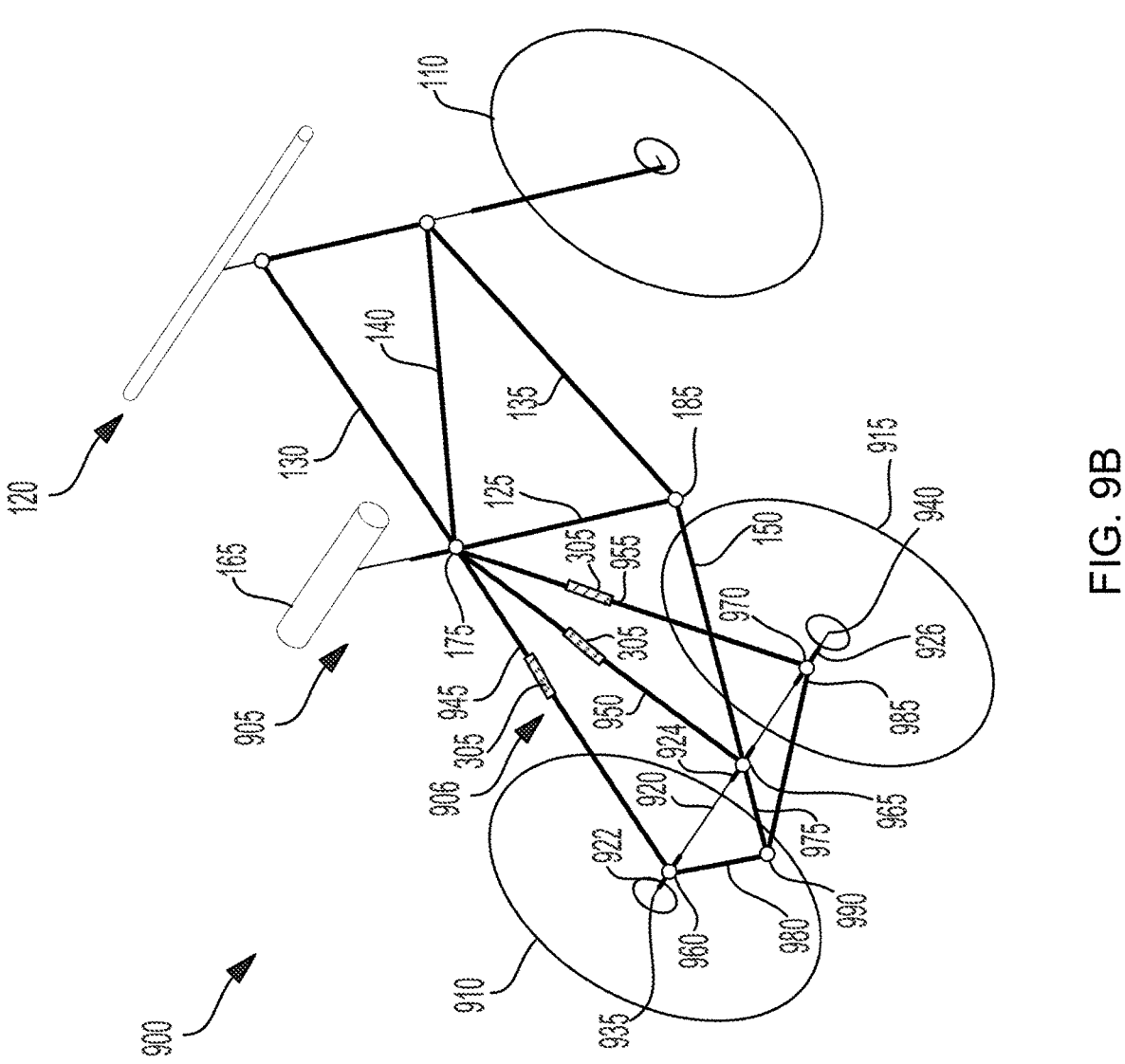
FIG. 9B is a perspective view of a three-wheeled vehicle or delta tricycle, according to an exemplary embodiment.
Figure 9C:
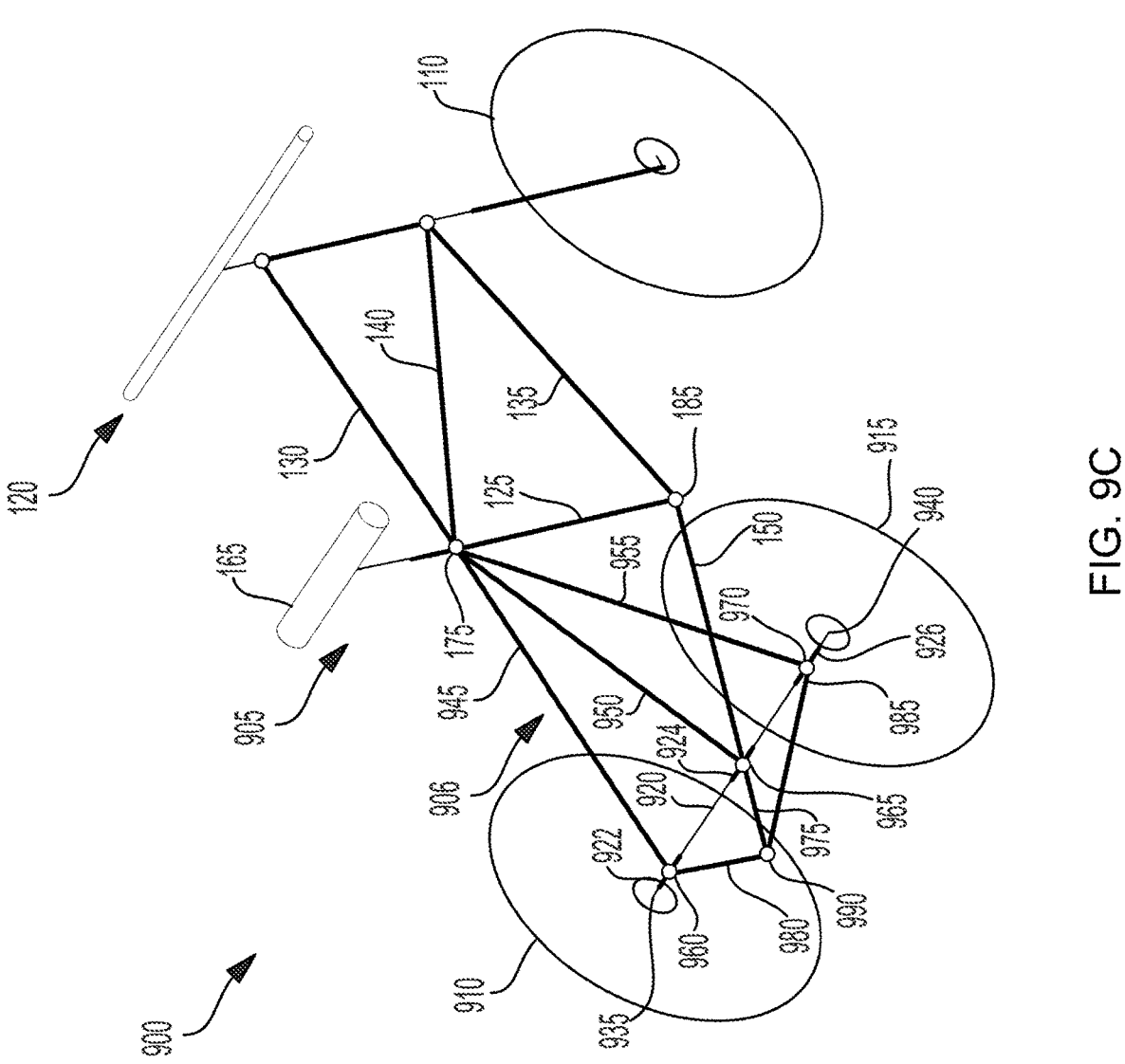
FIG. 9C is a perspective view of a three-wheeled vehicle or delta tricycle, according to an exemplary embodiment.

As shown in FIGS. 9B and 9C, in some embodiments, the delta tricycle 900 may have no joints 928. In some embodiments, a rear shock absorber 305 may be disposed on the seat stay 950. The rear shock absorber 305 on the seat stay 950 can provide the delta tricycle 900 with a dependent suspension system. In some embodiments, the delta tricycle 900 may have no rear shock absorbers 305.

Figure 10:
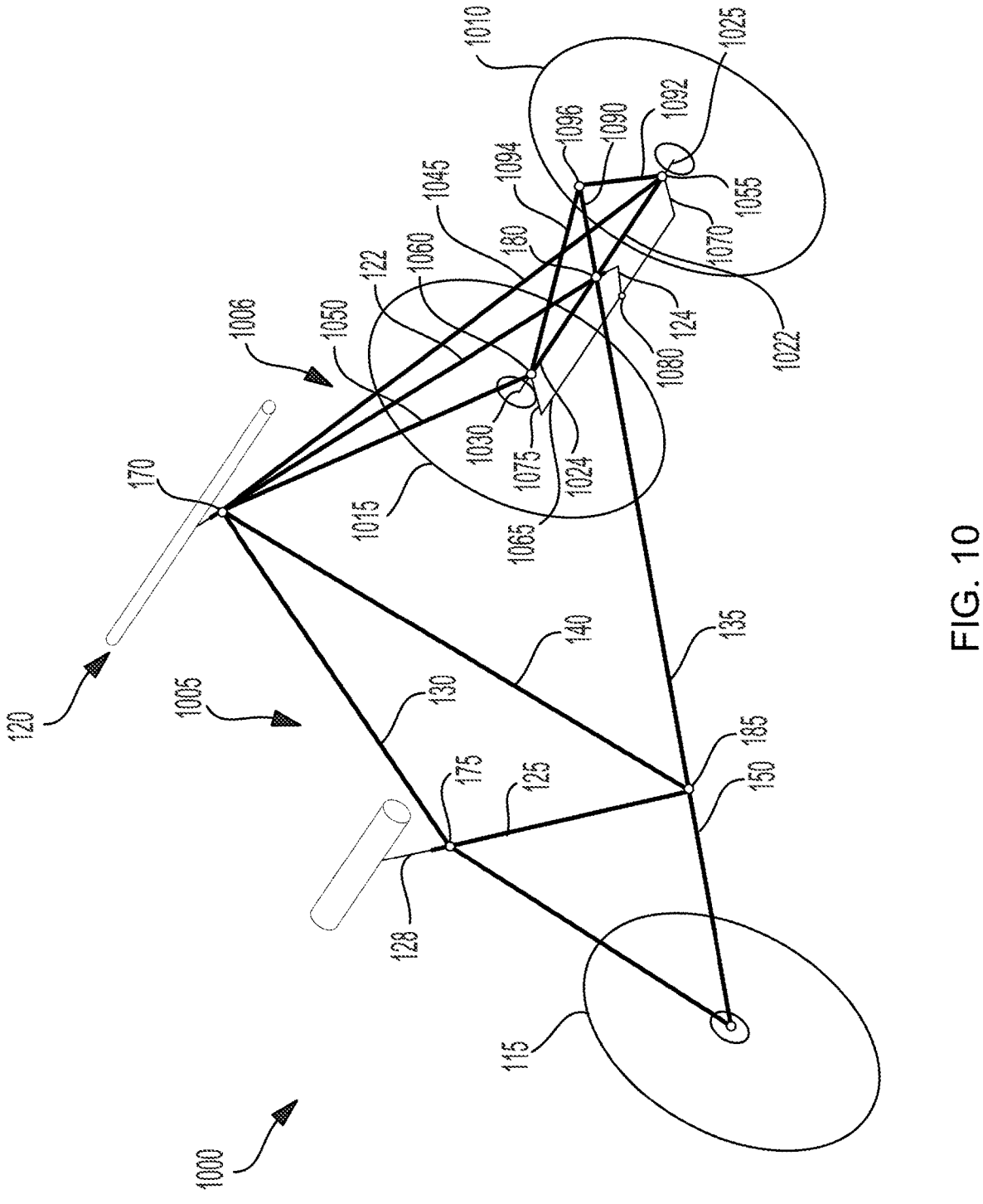
FIG. 10 is a perspective view of a three-wheeled vehicle or tadpole tricycle, according to an exemplary embodiment.

Referring now to FIG. 10, an isometric view of a three-wheeled vehicle (shown as tadpole tricycle 1000) is shown, according to an exemplary embodiment. The tadpole tricycle 1000 includes a frame 1005. Similar to delta tricycle 900, tadpole tricycle 1000 can incorporate any frame configuration disclosed herein. For example, the frame 1005 may be similar to frame 105. For example, frame 1005 includes a head tube assembly 120, a seat tube 125, a top tube 130, a down tube 135, and a brace member 140. The tadpole tricycle 1000 includes a first front wheel, shown as right front wheel 1010, a second front wheel, shown as left front wheel 1015, and a rear wheel 115. The tadpole tricycle 1000 includes a front assembly 1006. The front assembly 1006 can include additional members of the frame 1005 as described herein that are disposed proximate to a front of the tadpole tricycle 1000 (e.g., in front of the seat tube 125 and/or adjacent to the head tube assembly 120). The front assembly 1006 can include the members of the frame 1005 that accommodate and control the two front wheels 1010, 1015.

The frame 1005 further includes a first front axle tube, shown as right front axle tube 1022, and a second front axle tube, shown as left front axle tube 1024. The right front axle tube 1022 may couple with the left front axle tube via the second head tube work point 180. The right front axle tube 1022 can have a first stub axle, shown as right front stub axle 1025, disposed at a first end of the right front axle tube 1022 and the left front axle tube 1024 can have a second stub axle, shown as left front stub axle 1030, disposed at a first end of the left front axle tube 1024. The right front stub axle 1025 can be coupled to the right front axle tube 1022 and the left front stub axle 1030 can be coupled to the left front axle tube 1024. The right front wheel 1010 is coupled to the frame 1005 via the right front stub axle 1025. The left front wheel 1015 is coupled to the frame 1005 via the left front stub axle 1030.

The frame 1005 further includes a first arm tube, shown as right arm tube 1045 and a second arm tube, shown as left arm tube 1050. A first end of the right arm tube 1045 can be coupled to or integral with the right front axle tube 1022 at a first front axle work point, shown as right front axle work point 1055. The right front axle work point 1055 can be disposed proximate to a first end of the right front axle tube 1022. A first end of the left arm tube 1050 can be coupled to or integral with the left front axle tube 1024 at a second front axle work point, shown as left front axle work point 1060. The left front axle work point 1060 can be disposed proximate to a first end of the left front axle tube 1024. A second end of each of the right arm tube 1045 and the left arm tube 1050 can be coupled to or integral with the head tube assembly 120. For example, the second end of each arm tube 1045, 1050 may be coupled to the head tube assembly 120 via the first head tube work point 170.

The frame 1005 further includes a nose tube 1090. The nose tube 1090 is coupled to the head tube 122. For example, a first end of the nose tube 1090 can couple to the head tube 122 via the second head tube work point 180. The nose tube 1090 can extend from the head tube 122 in a forward direction (e.g., away from a rear of the quadricycle 1100). The nose tube 1090 can extend parallel to the down tube 135. The frame 1105 can further include a first nose tube brace, shown as right nose tube brace 1092, and a second nose tube brace, shown as left nose tube brace 1094. The right nose tube brace 1092 can couple to the right front axle tube 1022. For example, a first end of the right nose tube brace 1092 can couple to the right front axle tube 1022 via the right front axle work point 1055. The left nose tube brace 1094 can couple to the left front axle tube 1024. For example, a first end of the left nose tube brace 1094 can couple to the left front axle tube 1024 via the left front axle work point 1060. A second end of the nose tube 1090 can couple to or be integral with a second end of the right nose tube brace 1092 and a second end of the left nose tube brace 1094 at a nose tube work point 1096.

The frame 1005 further includes a tie rod 1065. The tie rod 1065 can be disposed behind the right nose tube brace 1092 and the left nose tube brace 1094. The tie rod 1065 includes a first steer arm, shown as right steer arm 1070, and a second steer arm, shown as left steer arm 1075. The right steer arm 1070 can couple to the right front stub axle 1025 at or adjacent to the right front axle work point 1055. The left steer arm 1075 can couple to the left front stub axle 1030 at or adjacent to the left front axle work point 1060. A bottom end of the steer tube 124 (or the lower steer tube 522) can couple to the tie rod 1065 at a tie rod work point 1080. The tie rod work point 1080 can be disposed proximate to a center of the tie rod 1065. In some embodiments, the tie rod work point 1080 divides the tie rod 1065 into a first portion and a second portion. The first portion of the tie rod 1065 can be coupled to the second portion of the tie rod 1065 via the tie rod work point 1080. The steer tube 124, tie rod 1065, right steer arm 1070, left steer arm 1075, right front stub axle 1025, and left front stub axle 1030 can facilitate steering of the tadpole tricycle 1000. The couplings between the steer tube 124, tie rod 1065, right steer arm 1070, left steer arm 1075, right front stub axle 1025, and left front stub axle 1030 can be any coupling that facilitates movement between the components to properly steer the tadpole tricycle 1000. For example, the frame 1005 can include a plurality of ball joints to allow the steer tube 124 to control movement of the right front wheel 1010 and the left front wheel 1015. A ball joint can be disposed, for example, where the right steer arm 1070 couples to the tie rod 1065, where the left steer arm 1075 couples to the tie rod 1065, and on either side of where the steer tube 124 couples to the tie rod 1065. A hinge may be disposed on the right front stub axle 1025 and the left front stub axle 1030 proximate to the right front axle work point 1055 and the left front axle work point 1060. The steer tube 124, the tie rod 1065, and the tie rod work point 1080 may comprise a rack and pinion steering mechanism such that when the steer tube 124 rotates, the steer tube 124 rotates a pinion, which in turn engages gears of a rack (e.g., the tie rod 1065) and turns the front wheels 1010, 1015. Some or all of the connections between members of the frame 1005 can include loose connections, as described herein.

Figure 11:
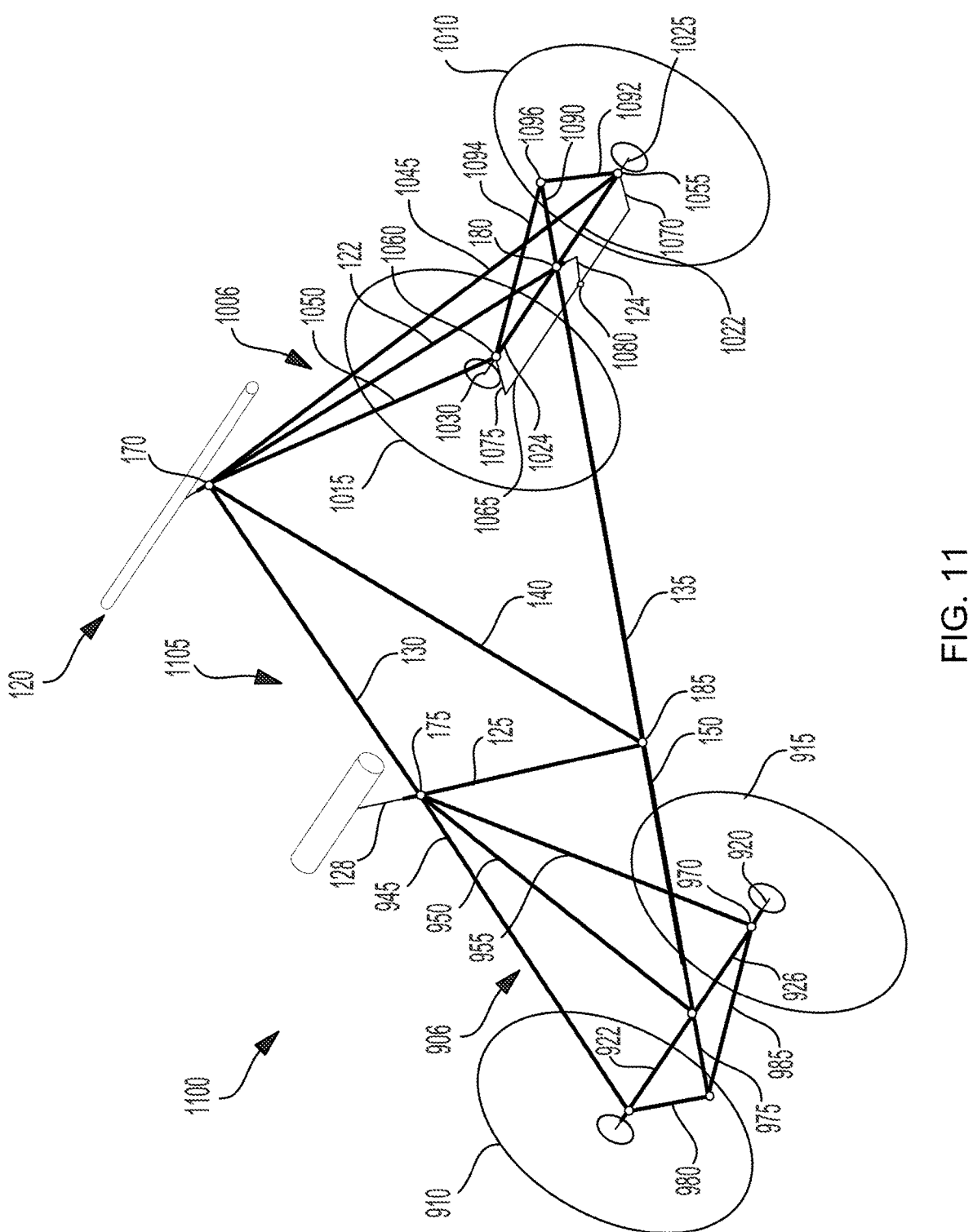
FIG. 11 is a perspective view of a four-wheeled vehicle or quadricycle, according to an exemplary embodiment.

Referring now to FIG. 11, an isometric view of a four-wheeled vehicle (shown as quadricycle 1100) is shown, according to an exemplary embodiment. The quadricycle 1100 includes a frame 1105. The frame members of the bicycle 100, the delta tricycle 900, and the tadpole tricycle 1000 can be combined to create the frame 1105. For example, the quadricycle 1100 can include a rear assembly 906 and a front assembly 1006. For example, the quadricycle 1100 can include the two front wheels 1010, 1015 and the two rear wheels 910, 915 as well as the accompanying members. For example, the frame 1105 can include the rear axle 920, the seat stay 950, the leg tubes 945, 955, the tail tube 975, and the tail tube braces 980, 985 to accommodate the rear wheels 910, 915. The frame 1105 can include the right front axle tube 1022 and left front axle tube 1024, the arm tubes 1045, 1050, the tie rod 1065, the steer arms 1070, 1075, the nose tube 1090, and the nose tube braces 1092, 1094 to accommodate the front wheels 1010, 1015. The frame 1105 can include the head tube assembly 120, the seat tube 125, the top tube 130, the down tube 135, and the brace member 140 to connect the front wheels 1010, 1015 to the rear wheels 910, 915.

Figure 12:
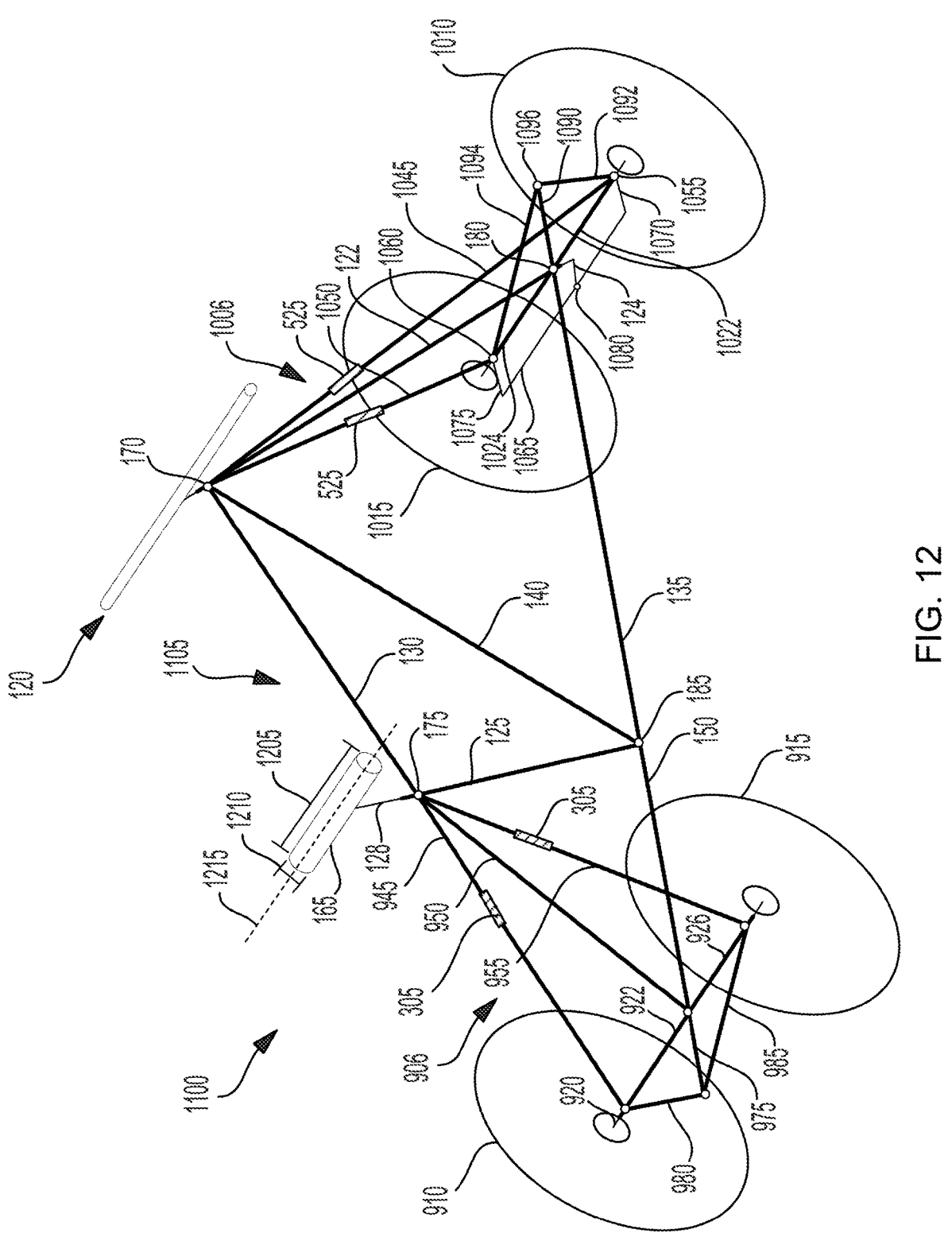
FIG. 12 is a perspective view of a four-wheeled vehicle or quadricycle, according to an exemplary embodiment.

Referring now to FIG. 12, an isometric view of quadricycle 1100 is shown, according to an exemplary embodiment. The frame 1105 of quadricycle 1100 can incorporate any frame configuration disclosed herein. For example, frame 1105 can include any number of suspension mechanisms (e.g., rear shock absorber 305, extension spring 525) and may include the brace member 140 disposed at any of the various orientations. For example, the frame 1105 may include a first rear shock absorber 305 disposed on the left leg tube 945, a second rear shock absorber 305 disposed on the seat stay 950, and a third rear shock absorber 305 disposed on the right leg tube 955. Frame 1105 may include a first rear shock absorber 305 disposed on the left arm tube 1050 and a second rear shock absorber 305 disposed on the right arm tube 1045. A rear end of the brace member 140 may be coupled to the seat tube 125 via the first seat tube work point 175 and a front end of the brace member 140 may be coupled to one of the second or third head tube work points 180, 505. In some embodiments, the rear end of the brace member 140 may be coupled to the seat tube 125 via the second seat tube work point 185 and the front end of the brace member 140 may be coupled to the first head tube work point 170. Some or all of the connections between members of the frame 1105 can include loose connections, as described herein.

Any vehicle, including the vehicles described herein (e.g., bicycle 100, delta tricycle 900, tadpole tricycle 1000, quadricycle 1100) can include a seat 165. The seat 165 can be coupled to or integrated with the seat post 128. As shown in FIG. 12, among others, the seat 165 can have an elongated shape. For example, the seat 165 can have a (lateral) length 1205 and a (longitudinal) width 1210. The length 1205 can be longer than the width 1210. In some embodiments, the length 1205 can be four times as long as the width 1210. For example, the length 1205 can be approximately 13 inches (+/−1 inch) and the width 1210 can be approximately 3 inches (+/−1 inch). The seat 165 can have any shape. For example, the seat 165 can have a cylindrical shape. Seat 165 can extend along a single central axis 1215. The seat 165 can extend symmetrically around the central axis 1215. For example, a cross-sectional shape of the seat 165 can be symmetric with respect to the central axis 1215. The seat 165 can extend substantially perpendicular (+/−10%) to a plane of the frame. For example, the seat 165 can extend substantially perpendicular to at least one of the top tube 130, the brace member, 140, or the down tube 135. For example, the length 1205 of the seat 165 can be perpendicular to the top tube 130.

Figure 13:
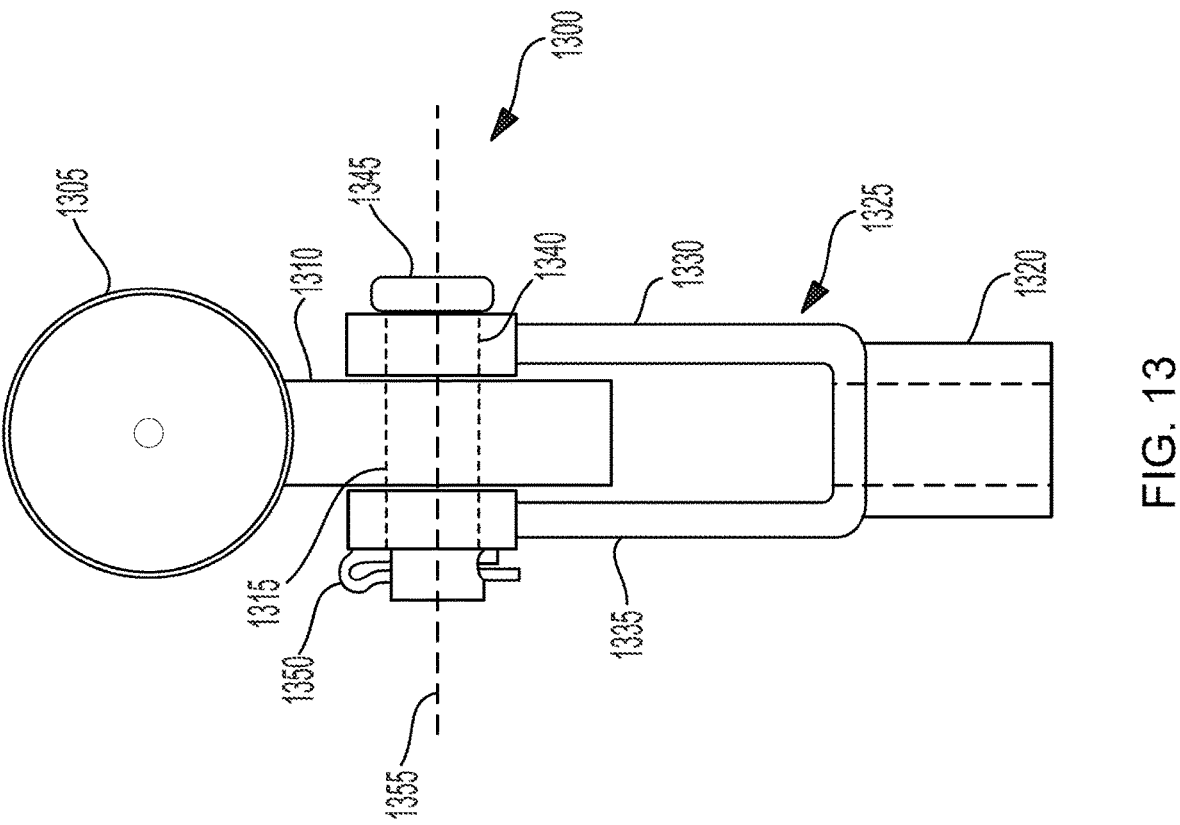
FIG. 13 is a view of a joint or coupling, according to an exemplary embodiments.

Referring now to FIG. 13, a pivotally coupled work joint 1300 is shown, according to an exemplary embodiment. The pivotally coupled work joint 1300 is an example pivot joint that can disposed at a work point. Any other pivot joint can also be used to provide the desired pivotable connection points. The pivotally coupled work joint 1300 may be disposed at any of the work points described herein (e.g., first head tube work point 170, first seat tube work point 175, etc.). The pivotally coupled work joint 1300 includes a first frame member 1305 (e.g., the head tube 122, the seat tube 125) that has at least one tab plate 1310 that extends away from the first frame member 1305. The tab plate 1310 has at least one opening 1315 (e.g., a circular hole or aperture) that extends through the tab plate 1310. A second frame member 1320 has a clevis rod end 1325 configured to extend around the tab plate 1310. For example, the clevis rod end 1325 can include a first prong 1330 that extends along a first side of the tab plate 1310 and a second prong 1335 that extends along a second side of the tab plate 1310. The clevis rod end 1325 has an aperture 1340 that extends through both prongs 1330, 1335. The aperture 1340 is configured to align with the opening 1315 of the tab plate 1310. A pin 1345 is configured to extend through the clevis rod end and the tab plate 1310 when the opening 1315 is aligned with the aperture 1340. For example, the pin 1345 can extend through the aperture 1340 of the first prong 1330, the opening of the tab plate 1310, and the aperture 1340 of the second prong 1335 to couple the tab plate 1310 and the clevis rod end 1325 together. A cotter pin 1350 extends through a hole of the pin 1345 perpendicular to an axis 1355 of the pin 1345, to prevent the pin 1345 from being retracted after insertion through the opening 1315 and the aperture 1340. The pin 1345 allows for a loose connection point between the frame members. For example, the pin 1345 facilitates rotation of the second frame member 1320 around the axis 1355. Such rotation can be in the same plane as the first frame member 1305. The use of a cotter pin 1350 allows for retraction of the pin 1345 from the clevis rod end 1325 to facilitate disassembly of the frame 105, 905, 1005 without the use of tools.

Figure 14:
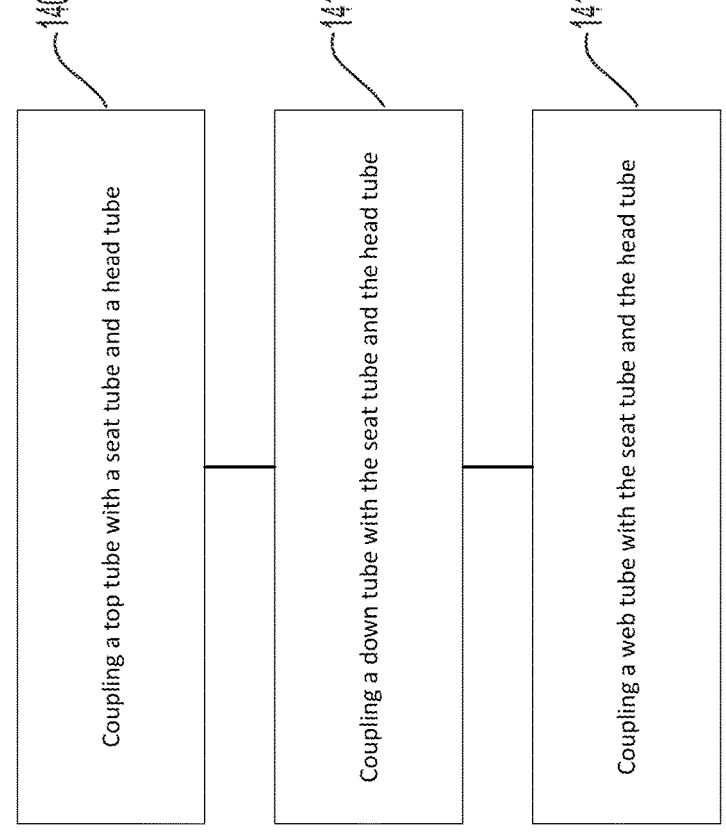
FIG. 14 is a block diagram of a method for assembling a multi-wheeled vehicle frame, according to an exemplary embodiment.

Referring now to FIG. 14, a method 1400 for assembling a multi-wheeled vehicle frame is shown, according to an exemplary embodiment. Method 1400 can be for assembling bicycle 100, delta tricycle 900, tadpole tricycle 1000, and quadricycle 1100. Method 1400 includes coupling a top tube 130 with a seat tube 125 and a head tube assembly 120 (step 1405), coupling a down tube 135 with the seat tube 125 and the head tube assembly 120 (step 1410), and coupling a brace member 140 with the seat tube 125 and the head tube assembly 120 (step 1415). Step 1405 may include pivotally coupling the top tube 130 with the seat tube 125 and pivotally coupling the top tube 130 with the head tube assembly 120. The top tube 130 may be coupled with the head tube assembly 120 at a first head tube work point 170. The top tube 130 may be coupled with the seat tube 125 at a first seat tube work point 175.

Step 1410 may include pivotally coupling the down tube 135 with the seat tube 125 and pivotally coupling the down tube 135 with the head tube assembly 120. The down tube 135 may be coupled with the head tube assembly 120 at a second head tube work point 180. The down tube 135 may be coupled with the seat tube 125 at a second seat tube work point 175.

Step 1415 may include pivotally coupling the brace member 140 with the seat tube 125 and pivotally coupling the brace member 140 with the head tube assembly 120. The brace member 140 may couple with the seat tube 125 at one of the first seat tube work point 175 or the second seat tube work point 185. The brace member 140 may couple with the head tube assembly 120 at the first head tube work point 170, the second head tube work point 180, or at a third head tube work point 505.

Method 1400 may also include coupling additional members to the frame 105. For example, method 1400 may include coupling a seat stay 145 and/or a chain stay 150 with the seat tube 125. The seat stay 145 and the chain stay 150 may be pivotally coupled with the seat tube 125.

Method 1400 may also include providing at least one shock absorber 305 or extension spring 525. For example, method 1400 may include providing at least one of a shock absorber 305 to the seat stay 145 or an extension spring 525 to the down tube 135. The shock absorber 305 may be disposed closer to a front end of the seat stay 145 than a rear end of the seat stay 145. The extension spring 525 may be disposed closer to a front end of the down tube 135 than a rear end of the down tube 135.

Method 1400 may also include separating the head tube assembly 120 into a first (e.g., upper) portion 515 and a second (e.g., lower) portion 520 by disposing a joint 510 in the head tube assembly 120. The joint 510 can be any kind of joint 510 (e.g., a hinge, a universal joint).

As utilized herein, the terms "approximately," "about," "around," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "in front," "behind," "above," "below") are merely used to describe the orientation of various elements in the FIGURES. For example, the orientation can be based on a perspective of a user facing a front of the multi-wheeled vehicle. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. In addition, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the bicycle 100 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A frame for a multi-wheeled vehicle, the frame comprising:
   a head tube;
   a seat tube disposed away from the head tube, the seat tube defining a seat tube neutral axis;
   a top tube coupled to the seat tube at a first seat tube work point and coupled to the head tube at a first head tube work point, the top tube defining a top tube neutral axis, wherein the seat tube neutral axis and the top tube neutral axis intersect at the first seat tube work point;

a brace member coupled to the seat tube and coupled to the head tube, the brace member defining a brace member neutral axis; and a down tube coupled to the seat tube at a second seat tube work point and coupled to the head tube at a second head tube work point, the down tube defining a down tube neutral axis, wherein the seat tube neutral axis and the down tube neutral axis intersect at the second seat tube work point, wherein the brace member is coupled to the seat tube at the first seat tube work point or the second seat tube work point such that the brace member neutral axis intersects with the seat tube neutral axis and the top tube neutral axis at the first seat tube work point or with the seat tube neutral axis and the down tube neutral axis at the second seat tube work point.

2. The frame of claim 1, wherein:

the brace member is coupled to the seat tube at the first seat tube work point and coupled to the head tube at the second head tube work point.

3. The frame of claim 1, wherein the frame defines a plane extending through the head tube, the seat tube, the top tube, the down tube and the brace member, the frame further comprising:

a seat post extending into the seat tube, wherein the seat post is coupled to a seat, wherein the seat comprises an elongated shape having a first elongated portion extending outwardly from the plane and a second elongated portion extending outwardly from the plane opposite the first elongated portion.

4. The frame of claim 1, wherein:

the brace member is coupled to the seat tube at the second seat tube work point and coupled to the head tube at the first head tube work point.

5. The frame of claim 1, further comprising a front assembly, the front assembly comprising:

a first front axle tube coupled to the head tube at the second head tube work point;

a second front axle tube coupled to the head tube at the second head tube work point, the second front axle tube opposite the first front axle tube;

a first arm tube coupled to the head tube at the first head tube work point and coupled to the first front axle tube at a first front axle work point;

a second arm tube coupled to the head tube at the first head tube work point and coupled to the second front axle tube at a second front axle work point;

a nose tube coupled to the head tube at the second head tube work point, wherein the nose tube extends away from the down tube;

a first nose tube brace coupled to the first front axle tube at the first front axle work point and coupled to the nose tube at a nose tube work point; and a second nose tube brace coupled to the second front axle tube at the second front axle work point and coupled to the nose tube at the nose tube work point;

wherein the front assembly couples a plurality of front wheels to the frame.

6. The frame of claim 5, wherein the front assembly further comprises:

a steer tube comprising a first end and a second end, wherein the first end of the steer tube is coupled to a handle and the second end of the steer tube is coupled to a tie rod, the tie rod comprising a first steer arm and a second steer arm, wherein:

the first steer arm is coupled to a first front stub axle, wherein the first front stub axle is pivotally coupled to the first front axle tube at or adjacent to the first front axle work point; and the second steer arm is coupled to a second front stub axle, wherein the second front stub axle is pivotally coupled to the second front axle tube at or adjacent to the second front axle work point.

7. The frame of claim 1, wherein:

the head tube comprises a first portion and a second portion; and the first head tube work point and a third head tube work point are disposed on the first portion and the second head tube work point is disposed on the second portion.

8. The frame of claim 7, wherein:

the brace member is coupled to the seat tube at the first seat tube work point and coupled to the head tube at the third head tube work point.

9. The frame of claim 7, wherein:

the brace member is coupled to the seat tube at the second seat tube work point and coupled to the head tube at the third head tube work point.

10. The frame of claim 1, further comprising a seat stay and a chain stay, the seat stay pivotally coupled to the seat tube at the first seat tube work point and pivotally coupled to a rear wheel work point, and the chain stay pivotally coupled to the seat tube at the second seat tube work point and pivotally coupled to the rear wheel work point.

11. The frame of claim 10, further comprising a rear shock absorber coupled to the seat stay.

12. The frame of claim 1, further comprising:

a fork member; and a steer tube coupled to the fork member, the steer tube comprising:

an upper steer tube coupled to a handle and a joint, the upper steer tube extending through an upper head tube of the head tube; and a lower steer tube coupled to the joint and the fork member, the lower steer tube extending through a lower head tube of the head tube;

wherein the fork member couples a front wheel to the frame.

13. The frame of claim 1, further comprising a front suspension mechanism coupled to the down tube.

14. The frame of claim 10, further comprising a rear assembly, the rear assembly comprising:

a plurality of rear axle tubes comprising a first rear axle tube, a second rear axle tube, and a third rear axle tube;

a plurality of leg tubes coupled to the seat tube at the first seat tube work point and each of the plurality of leg tubes coupled to one of the plurality of rear axle tubes;

a tail tube coupled to the chain stay at a rear axle work point, wherein the tail tube extends away from the chain stay;

a first tail tube brace coupled to the second rear axle tube and coupled to the tail tube at a tail work point; and a second tail tube brace coupled to the third rear axle tube and coupled to the tail tube at the tail work point;

wherein the rear assembly couples a plurality of rear wheels to the frame.

15. The frame of claim 14, further comprising a plurality of pivot joints disposed at or adjacent to at least one of:

the first or second seat tube work points, the first, second, or third head tube work points, a first or second front axle work point, a nose tube work point,
the rear wheel work point,
a first or second rear axle work point, or
a tail tube work point;
wherein each of the plurality of pivot joints comprises
a pin that defines an axis of rotation for at least one
of the top tube, the down tube, the brace member, a
first front axle tube, a second front axle tube, a first
arm tube, a second arm tube, a nose tube, a first nose
tube brace, a second nose tube brace, the first rear
axle tube, the second rear axle tube, the third rear
axle tube, the plurality of leg tubes, the tail tube, the
first tail tube brace, or the second tail tube brace.

16. The frame of claim 15, wherein the plurality of leg
tubes comprise a first leg tube and a second leg tube, the
frame further comprising: a first shock absorber coupled to
the first leg tube; and
a second shock absorber coupled to the second leg tube.

17. A method for assembling a multi-wheeled vehicle, the
method comprising:
coupling a top tube to a seat tube at a first seat tube work
point and to a head tube at a first head tube work point,
the top tube defining a top tube neutral axis and the seat
tube defining a seat tube neutral axis, wherein the seat
tube neutral axis and the top tube neutral axis intersect
at the first seat tube work point;
coupling a down tube to the seat tube at a second seat tube
work point and to the head tube at a second head tube
work point, the down tube defining a down tube neutral
axis, wherein the seat tube neutral axis and the down
tube neutral axis intersect at the second seat tube work
point; and
coupling a brace member to the seat tube and the head
tube, the brace member defining a brace member neu-
tral axis, wherein the brace member is coupled to the seat tube at the first seat tube work point or the second
seat tube work point such that the brace member neutral
axis intersects with the seat tube neutral axis and the top
tube neutral axis at the first seat tube work point or with
the seat tube neutral axis and the down tube neutral axis
at the second seat tube work point.

18. The method of claim 17, further comprising:
coupling the brace member to the head tube at the first
head tube work point;
and
coupling the brace member to the seat tube at the second
seat tube work point.

19. The method of claim 17, further comprising:
coupling the brace member to the seat tube at the first seat
tube work point; and
coupling the brace member to the head tube at the second
head tube work point.

20. A multi-wheeled vehicle comprising:
a head tube;
a seat tube disposed away from the head tube;
a top tube coupled to the seat tube and coupled to the head
tube;
a brace member coupled to the seat tube and coupled to
the head tube;
a down tube coupled to the seat tube and coupled to the
head tube;
a seat stay having a first end and a second end, the first end
of the seat stay pivotally coupled to the seat tube at a
first location; and
a chain stay having a first end and a second end, the first
end of the chain stay pivotally coupled to the seat tube
at a second location and the second end of the chain
stay pivotally coupled to the second end of the seat stay.

* * * * *